United States Patent
Gupta et al.

(10) Patent No.: US 10,728,163 B2
(45) Date of Patent: Jul. 28, 2020

(54) APPLICATION AND NETWORK AWARE ADAPTIVE COMPRESSION FOR BETTER QOE OF LATENCY SENSITIVE APPLICATIONS

(71) Applicant: Citrix Systems, Inc., Fort Lauderdale, FL (US)

(72) Inventors: Anup Lal Gupta, Bangalore (IN); Praveen Raja Dhanabalan, Bangalore (IN)

(73) Assignee: Citrix Systems, Inc., Fort Lauderdale, FL (US)

( * ) Notice: Subject to any disclaimer, the term of this patent is extended or adjusted under 35 U.S.C. 154(b) by 0 days.

(21) Appl. No.: 15/643,268

(22) Filed: Jul. 6, 2017

(65) Prior Publication Data
US 2019/0014055 A1    Jan. 10, 2019

(51) Int. Cl.
| H04L 12/863 | (2013.01) |
| H04L 12/861 | (2013.01) |
| H04L 29/06 | (2006.01) |

(52) U.S. Cl.
CPC .......... *H04L 47/50* (2013.01); *H04L 49/9084* (2013.01); *H04L 67/42* (2013.01); *H04L 69/04* (2013.01)

(58) Field of Classification Search
CPC .......... H04L 47/50; H04L 69/04; H04L 67/42
USPC ........................................................ 370/230
See application file for complete search history.

(56) References Cited

U.S. PATENT DOCUMENTS

| 8,275,909 | B1* | 9/2012 | Rothstein | H03M 7/30 375/240 |
| 10,075,671 | B2* | 9/2018 | Mobasher | H04N 7/0127 |
| 2004/0095939 | A1* | 5/2004 | Yang | H04L 29/06 370/395.52 |
| 2010/0121972 | A1* | 5/2010 | Samuels | H04L 41/082 709/231 |
| 2012/0089775 | A1* | 4/2012 | Ranade | H03M 7/3091 711/113 |
| 2013/0077486 | A1* | 3/2013 | Keith | H04L 47/2433 370/230.1 |
| 2013/0094356 | A1* | 4/2013 | Keith | H04L 47/2433 370/229 |
| 2014/0146695 | A1* | 5/2014 | Kim | H04L 65/601 370/252 |
| 2017/0222930 | A1* | 8/2017 | Dhanabalan | H04L 47/12 |
| 2017/0278215 | A1* | 9/2017 | Appu | G06T 9/00 |

* cited by examiner

*Primary Examiner* — Robert C Scheibel
*Assistant Examiner* — Mohammed S Chowdhury
(74) *Attorney, Agent, or Firm* — Foley & Lardner LLP

(57) ABSTRACT

This disclosure is directed to embodiments of systems and methods for performing compression of data in a queue. A device intermediary between a client and a server may determine that a length of time to move existing data maintained in a queue from the queue exceeds a predefined threshold. The device may identify, responsive to the determination, a first quantity of the existing data to undergo compression, and a second quantity of the existing data according to a compression ratio of the compression. The device may reserve, according to the second quantity, a first portion of the queue that maintained the first quantity of the existing data, to place compressed data obtained from applying the compression on the first quantity of the existing. The device may place incoming data into the queue beyond the reserved first portion of the queue.

20 Claims, 11 Drawing Sheets

APPLICATION AND NETWORK AWARE ADAPTIVE COMPRESSION FOR BETTER QOE OF LATENCY SENSITIVE APPLICATIONS

FIELD OF THE DISCLOSURE

The present application generally relates to methods and systems for avoiding or managing network latency, including but not limited to methods and systems for performing compression of data in a queue.

BACKGROUND

Various optimization techniques on processing data packets such as compression may cause packet delay variation (also referred to as jitter), especially if improperly applied. As such, such optimization techniques may result in slower application responsiveness and in poor Quality of Experience (QoE) overall.

SUMMARY

This Summary is provided to introduce a selection of concepts in a simplified form that are further described below in the Detailed Description. This Summary is not intended to identify key features or essential features, nor is it intended to limit the scope of the claims included herewith.

The present disclosure is directed to systems and methods for performing compression of data in a queue. With an intermediary device deployed between a client and a server, it may difficult to apply processing or optimization techniques on data packets passed through the intermediary device while ensuring that no latency is introduced. For example, accumulation of packets received at the intermediary device for compression may lead or contribute to jitter and latency. Processing 10 milliseconds worth of packets at the intermediary device for instance may result in the introduction of an additional 10 millisecond of jitter for subsequently processed packets. As the amount of packets received at the intermediary device may dynamically vary, the compression process may cause variations in packet delay over time. This variance may be particularly problematic, with the scenario of multiple intermediary devices deployed between the client and the server which can introduce jitter or latency to packets communicated between the client and the server.

By dynamically selecting a subset amount of packets to be processed using optimization techniques such as compression, the present systems and methods may reduce or avoid jitter of network traffic passing through the intermediary device. The intermediary device may maintain a queue to accumulate or buffer data from multiple sources or linked devices. For example, the intermediary device may receive data from clients or servers via one network (e.g., a local area network (LAN)) and may receive data from other intermediary devices also deployed between the clients and the servers via another network (e.g., a wide area network (WAN)). The data from each source may be transmitted and/or received at a rate different from that of data from other sources (e.g., time delays t, u, and v). The data in the queue may be offloaded, transferred and/or transmitted at various rates to a plurality of data sinks (e.g., time delays t, u, and v), which can comprise data links or packet processing modules/devices. The amount of time then in processing the last packet in the queue may correspond to a quotient or function of the accumulated queue size (Q) and the sum of data rates from the multiple sinks (e.g., t, u, and v). If one of these data sinks (e.g., v) fails or is determined to be inefficient in transferring data from the queue, the amount of time in processing the packets queued at the intermediary device may increase $$\left(\text{e.g., from } \frac{Q}{t+u+v} \text{ seconds to } \frac{Q}{t+u} \text{ seconds}\right),$$

thereby introducing or causing increased latency, delay or jitter in the queue.

To reduce and/or eliminate packet delay variation arising from applying optimization techniques such as compression, the intermediary device may constrain, manage or perform such optimization techniques (e.g., compression, encryption, and de-duplication)) by determining the amount of packets accumulated in the queue. To determine the subset of packets, the intermediary device may track, monitor or sample the accumulated number of packets (e.g., via the position of one or more pointers, to first packet and last packet in the queue for instance) to calculate an estimated amount of time to process the packets $$\left(\text{e.g., } \frac{Q}{t+u+v} \text{ seconds}\right).$$

The intermediary device may compare the estimated amount of time or the accumulated number/amount of packets, with a minimum threshold time or packet amount. If the estimated amount of time to process the packets (or the accumulated number/amount of packets) is greater than the minimum threshold time (or the threshold packet amount), the intermediary device may select a subset of packets in the queue (e.g., after taking into account a compression cycle) subsequent to the minimum threshold time, for compression. The compression cycle may correspond to an amount of time that the intermediary device consumes in compressing the selected subset of packets. For instance, packets in the queue prior to the compression cycle subsequent to the minimum threshold time may remain uncompressed, and may be allowed to be sent from queue to one or more data sinks without compression. The intermediary device may reserve a first portion of the queue for buffering the compressed data, for example beyond the compression cycle subsequent to the minimum threshold time, and may also set aside a second portion of the queue beyond the first portion for queuing or buffering incoming coming data. By reserving the two portions of the queues in this manner, the intermediary device may perform compression and/or other optimization techniques while additional packets arrive into the queue, thereby reducing and/or eliminating jitter and other delays from processing the entire queue. Although the above example was described in the context of compression, the same concepts can be applied to other optimization techniques or type of packet processing.

In one aspect, the present disclosure is directed to a method of performing compression of data in a queue. A device intermediary between a client and a server may determine that a length of time to move existing data maintained in a queue from the queue exceeds a predefined threshold. The device may identify, responsive to the determination, a first quantity of the existing data to undergo compression, and a second quantity of the existing data according to a compression ratio of the compression. The device may reserve, according to the second quantity, a first portion of the queue that maintained the first quantity of the existing data, to place compressed data obtained from applying the compression on the first quantity of the existing data. The device may place incoming data into the queue beyond the reserved first portion of the queue.

In some embodiments, the existing data maintained in the queue may include data to be moved from the queue to one or more links for transfer or processing between the client and the server. In some embodiments, the device may apply the compression on the first quantity of the existing data, wherein the compression does not introduce jitter to the connection. In some embodiments, the device may determine not to apply compression on the incoming data, responsive to determining that a length of time for moving the incoming data from the queue does not exceed the predefined threshold.

In some embodiments, the device may determine a portion of the expected length of time that exceeds the predefined threshold. In some embodiments, the device may subtract a length of time for applying the compression from the determined portion to obtain a remaining length of time. In some embodiments, the device may identify the first quantity of the existing data to undergo compression, according to the remaining length of time. In some embodiments, placing the incoming data into the queue beyond the reserved first portion of the queue may provide a reduction in delay for communicating the incoming data between the client and the server.

In some embodiments, the device may move a third quantity of the existing data from the queue to one or more links. The one or more links may include a first link that at least one of: communicates or processes at least a portion of the third quantity of the data between the client and the server. In some embodiments, the device may move a third quantity of the existing data from the queue to one or more links, while applying the compression on the first quantity of the existing data. In some embodiments, the device may place the incoming data into the queue beyond the reserved first portion of the queue, before or after the compression on the first quantity of the existing data is completed.

In another aspect, the present disclosure is directed to a system for performing compression of data in a queue. The system may include a queue of a device intermediary between a client and a server. The queue may maintain existing data received from the client or the server. The system may include a compression engine of the device. The compression engine may determine that a length of time, for moving the existing data maintained in the queue from the queue, exceeds a predefined threshold. The compression engine may identify, responsive to the determination, a first quantity of the existing data to undergo compression, and a second quantity of the existing data according to a compression ratio of the compression. The compression engine may reserve, according to the second quantity, a first portion of the queue that maintained the first quantity of the existing data, to place compressed data obtained from applying the compression on the first quantity of the existing data. The compression engine may place incoming data into the queue beyond the reserved first portion of the queue.

In some embodiments, the existing data maintained in the queue may include data to be moved from the queue to one or more links for transfer or processing between the client and the server. In some embodiments, the compression engine may apply the compression on the first quantity of the existing data, wherein the compression does not introduce jitter to the connection. In some embodiments, the compression engine may determine not to apply compression on the incoming data, responsive to determining that a length of time for moving the incoming data from the queue does not exceed the predefined threshold.

In some embodiments, the compression engine may determine a portion of the expected length of time that exceeds the predefined threshold. In some embodiments, the compression engine may subtract a length of time for applying the compression from the determined portion to obtain a remaining length of time. In some embodiments, the compression engine may identify the first quantity of the existing data to undergo compression, according to the remaining length of time. In some embodiments, the compression engine may provide a reduction in delay for communicating the incoming data between the client and the server, in placing the incoming data into the queue beyond the reserved first portion of the queue In some embodiments, the compression engine may move a third quantity of the existing data from the queue to one or more links. The one or more links may include a first link that is configured to at least one of: communicate or process at least a portion of the third quantity of the data between the client and the server. In some embodiments, the compression engine may move a third quantity of the existing data from the queue to one or more links, while the compression is applied on the first quantity of the existing data. In some embodiments, the compression engine may place the incoming data into the queue beyond the reserved first portion of the queue, before or after the compression on the first quantity of the existing data is completed.

BRIEF DESCRIPTION OF THE DRAWING FIGURES

Objects, aspects, features, and advantages of embodiments disclosed herein will become more fully apparent from the following detailed description, the appended claims, and the accompanying drawing figures in which like reference numerals identify similar or identical elements. Reference numerals that are introduced in the specification in association with a drawing figure may be repeated in one or more subsequent figures without additional description in the specification in order to provide context for other features, and not every element may be labeled in every figure. The drawing figures are not necessarily to scale, emphasis instead being placed upon illustrating embodiments, principles and concepts. The drawings are not intended to limit the scope of the claims included herewith.

DETAILED DESCRIPTION

For purposes of reading the description of the various embodiments below, the following descriptions of the sections of the specification and their respective contents may be helpful:

Section A describes a network environment and computing environment which may be useful for practicing embodiments described herein;

Section B describes embodiments of systems and methods for delivering a computing environment to a remote user;

Section C describes embodiments of systems and methods for virtualizing an application delivery controller;

Section D describes embodiments of systems and methods for providing a clustered appliance architecture environment; and Section E describes embodiments of systems and methods for performing compression of data in a queue.

A. Network and Computing Environment

Figure 1A:
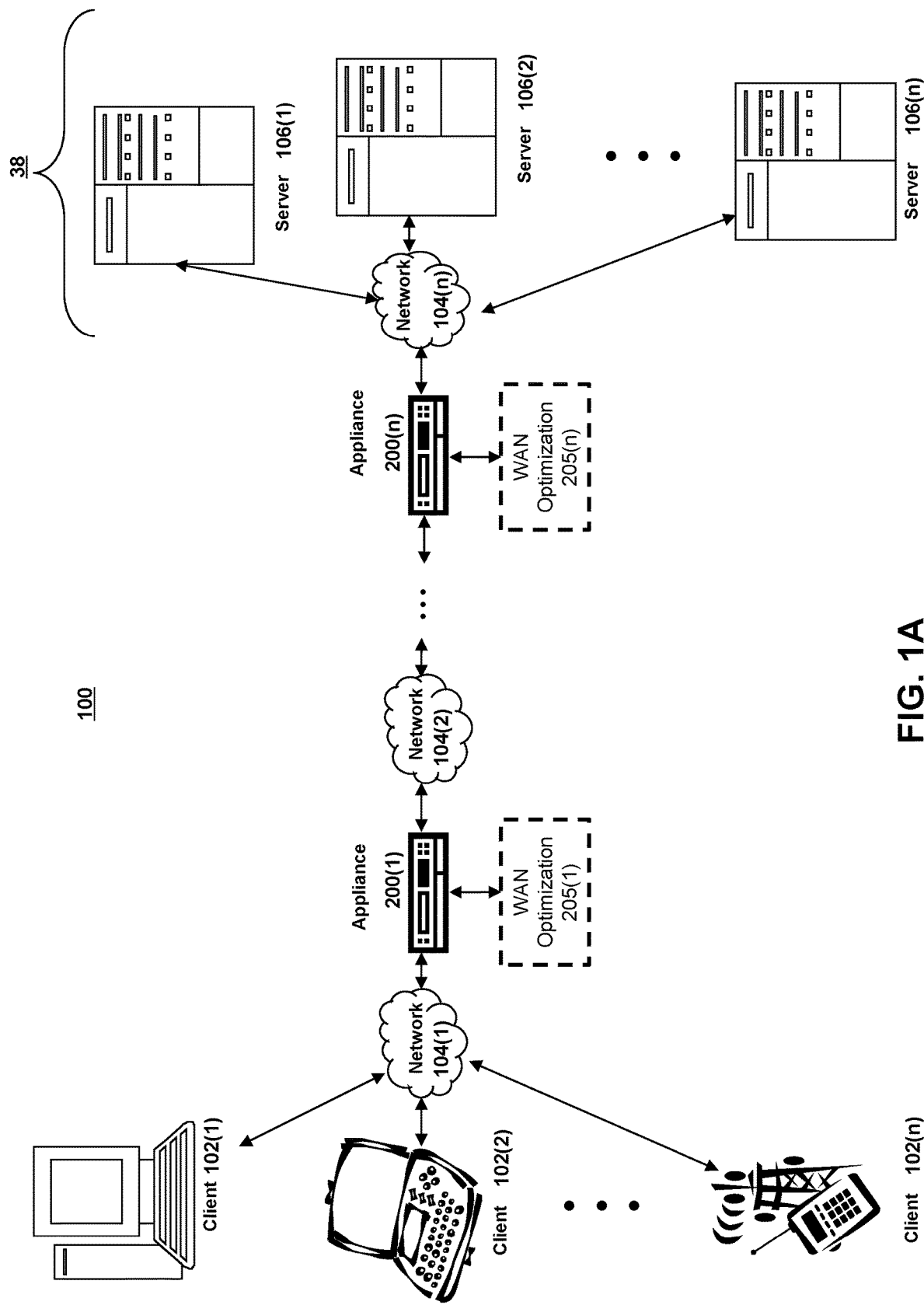
FIG. 1A is a block diagram of a network computing system, in accordance with an illustrative embodiment.

Referring to FIG. 1A, an illustrative network environment 100 is depicted. Network environment 100 may include one or more clients 102(1)-102(n) (also generally referred to as local machine(s) 102 or client(s) 102) in communication with one or more servers 106(1)-106(n) (also generally referred to as remote machine(s) 106 or server(s) 106) via one or more networks 104(1)-104n (generally referred to as network(s) 104). In some embodiments, a client 102 may communicate with a server 106 via one or more appliances 200(1)-200n (generally referred to as appliance(s) 200 or gateway(s) 200).

Although the embodiment shown in FIG. 1A shows one or more networks 104 between clients 102 and servers 106, in other embodiments, clients 102 and servers 106 may be on the same network 104. The various networks 104 may be the same type of network or different types of networks. For example, in some embodiments, network 104(1) may be a private network such as a local area network (LAN) or a company Intranet, while network 104(2) and/or network 104(n) may be a public network, such as a wide area network (WAN) or the Internet. In other embodiments, both network 104(1) and network 104(n) may be private networks. Networks 104 may employ one or more types of physical networks and/or network topologies, such as wired and/or wireless networks, and may employ one or more communication transport protocols, such as transmission control protocol (TCP), internet protocol (IP), user datagram protocol (UDP) or other similar protocols.

As shown in FIG. 1A, one or more appliances 200 may be located at various points or in various communication paths of network environment 100. For example, appliance 200 may be deployed between two networks 104(1) and 104(2), and appliances 200 may communicate with one another to work in conjunction to, for example, accelerate network traffic between clients 102 and servers 106. In other embodiments, the appliance 200 may be located on a network 104. For example, appliance 200 may be implemented as part of one of clients 102 and/or servers 106. In an embodiment, appliance 200 may be implemented as a network device such as NetScaler® products sold by Citrix Systems, Inc. of Fort Lauderdale, Fla.

As shown in FIG. 1A, one or more servers 106 may operate as a server farm 38. Servers 106 of server farm 38 may be logically grouped, and may either be geographically co-located (e.g., on premises) or geographically dispersed (e.g., cloud based) from clients 102 and/or other servers 106. In an embodiment, server farm 38 executes one or more applications on behalf of one or more of clients 102 (e.g., as an application server), although other uses are possible, such as a file server, gateway server, proxy server, or other similar server uses. Clients 102 may seek access to hosted applications on servers 106.

As shown in FIG. 1A, in some embodiments, appliances 200 may include, be replaced by, or be in communication with, one or more additional appliances, such as WAN optimization appliances 205(1)-205(n), referred to generally as WAN optimization appliance(s) 205. For example, WAN optimization appliance 205 may accelerate, cache, compress or otherwise optimize or improve performance, operation, flow control, or quality of service of network traffic, such as traffic to and/or from a WAN connection, such as optimizing Wide Area File Services (WAFS), accelerating Server Message Block (SMB) or Common Internet File System (CIFS). In some embodiments, appliance 205 may be a performance enhancing proxy or a WAN optimization controller. In one embodiment, appliance 205 may be implemented as CloudBridge® products sold by Citrix Systems, Inc. of Fort Lauderdale, Fla.

Figure 1B:
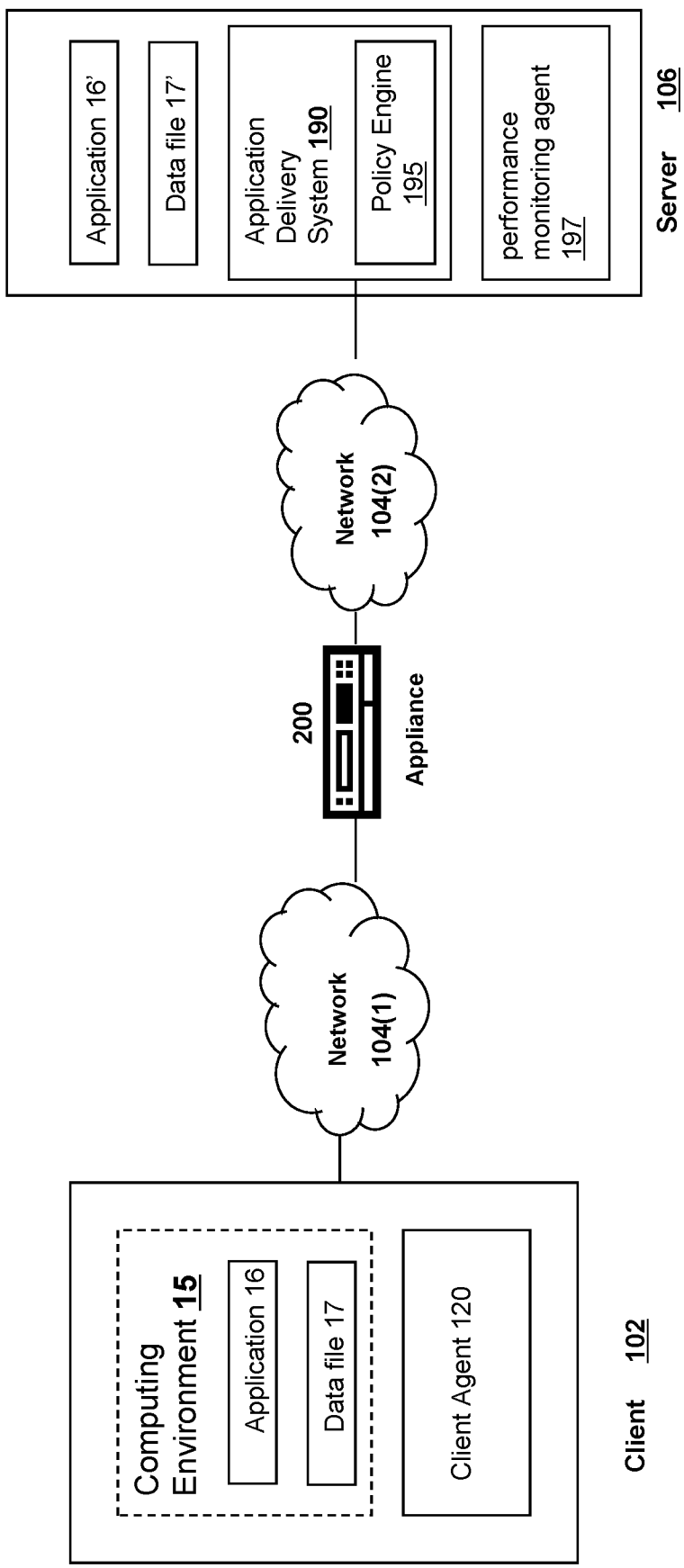
FIG. 1B is a block diagram of a network computing system for delivering a computing environment from a server to a client via an appliance, in accordance with an illustrative embodiment.

Referring to FIG. 1B, an example network environment, 100', for delivering and/or operating a computing network environment on a client 102 is shown. As shown in FIG. 1B, a server 106 may include an application delivery system 190 for delivering a computing environment, application, and/or data files to one or more clients 102. Client 102 may include client agent 120 and computing environment 15. Computing environment 15 may execute or operate an application 16 that accesses, processes or uses a data file 17. Computing environment 15, application 16 and/or data file 17 may be delivered via appliance 200 and/or the server 106.

Appliance 200 may accelerate delivery of all or a portion of computing environment 15 to a client 102, for example by the application delivery system 190. For example, appliance 200 may accelerate delivery of a streaming application and data file processable by the application from a data center to a remote user location by accelerating transport layer traffic between a client 102 and a server 106. Such acceleration may be provided by one or more techniques, such as: 1) transport layer connection pooling, 2) transport layer connection multiplexing, 3) transport control protocol buffering, 4) compression, 5) caching, or other techniques. Appliance 200 may also provide load balancing of servers 106 to process requests from clients 102, act as a proxy or access server to provide access to the one or more servers 106, provide security and/or act as a firewall between a client 102 and a server 106, provide Domain Name Service (DNS) resolution, provide one or more virtual servers or virtual internet protocol servers, and/or provide a secure virtual private network (VPN) connection from a client 102 to a server 106, such as a secure socket layer (SSL) VPN connection and/or provide encryption and decryption operations.

Application delivery management system 190 may deliver computing environment 15 to a user (e.g., client 102), remote or otherwise, based on authentication and authorization policies applied by policy engine 195. A remote user may obtain a computing environment and access to server stored applications and data files from any network-connected device (e.g., client 102). For example, appliance 200 may request an application and data file from server 106. In response to the request, application delivery system 190 and/or server 106 may deliver the application and data file to client 102, for example via an application stream to operate in computing environment 15 on client 102, or via a remote-display protocol or otherwise via remote-based or server-based computing. In an embodiment, application delivery system 190 may be implemented as any portion of the Citrix Workspace Suite™ by Citrix Systems, Inc., such as XenApp® or XenDesktop®.

Policy engine 195 may control and manage the access to, and execution and delivery of, applications. For example, policy engine 195 may determine the one or more applications a user or client 102 may access and/or how the application should be delivered to the user or client 102, such as a server-based computing, streaming or delivering the application locally to the client 120 for local execution.

For example, in operation, a client 102 may request execution of an application (e.g., application 16') and application delivery system 190 of server 106 determines how to execute application 16', for example based upon credentials received from client 102 and a user policy applied by policy engine 195 associated with the credentials. For example, application delivery system 190 may enable client 102 to receive application-output data generated by execution of the application on a server 106, may enable client 102 to execute the application locally after receiving the application from server 106, or may stream the application via network 104 to client 102. For example, in some embodiments, the application may be a server-based or a remote-based application executed on server 106 on behalf of client 102. Server 106 may display output to client 102 using a thin-client or remote-display protocol, such as the Independent Computing Architecture (ICA) protocol by Citrix Systems, Inc. of Fort Lauderdale, Fla. The application may be any application related to real-time data communications, such as applications for streaming graphics, streaming video and/or audio or other data, delivery of remote desktops or workspaces or hosted services or applications, for example infrastructure as a service (IaaS), workspace as a service (WaaS), software as a service (SaaS) or platform as a service (PaaS).

One or more of servers 106 may include a performance monitoring service or agent 197. In some embodiments, a dedicated one or more servers 106 may be employed to perform performance monitoring. Performance monitoring may be performed using data collection, aggregation, analysis, management and reporting, for example by software, hardware or a combination thereof. Performance monitoring may include one or more agents for performing monitoring, measurement and data collection activities on clients 102 (e.g., client agent 120), servers 106 (e.g., agent 197) or an appliances 200 and/or 205 (agent not shown). In general, monitoring agents (e.g., 120 and/or 197) execute transparently (e.g., in the background) to any application and/or user of the device. In some embodiments, monitoring agent 197 includes any of the product embodiments referred to as EdgeSight by Citrix Systems, Inc. of Fort Lauderdale, Fla.

The monitoring agents may monitor, measure, collect, and/or analyze data on a predetermined frequency, based upon an occurrence of given event(s), or in real time during operation of network environment 100. The monitoring agents may monitor resource consumption and/or performance of hardware, software, and/or communications resources of clients 102, networks 104, appliances 200 and/or 205, and/or servers 106. For example, network connections such as a transport layer connection, network latency, bandwidth utilization, end-user response times, application usage and performance, session connections to an application, cache usage, memory usage, processor usage, storage usage, database transactions, client and/or server utilization, active users, duration of user activity, application crashes, errors, or hangs, the time required to log-in to an application, a server, or the application delivery system, and/or other performance conditions and metrics may be monitored.

The monitoring agents may provide application performance management for application delivery system 190. For example, based upon one or more monitored performance conditions or metrics, application delivery system 190 may be dynamically adjusted, for example periodically or in real-time, to optimize application delivery by servers 106 to clients 102 based upon network environment performance and conditions.

In described embodiments, clients 102, servers 106, and appliances 200 and 205 may be deployed as and/or executed on any type and form of computing device, such as any desktop computer, laptop computer, or mobile device capable of communication over at least one network and performing the operations described herein. For example, clients 102, servers 106 and/or appliances 200 and 205 may each correspond to one computer, a plurality of computers, or a network of distributed computers such as computer 101 shown in FIG. 1C.

Figure 1C:
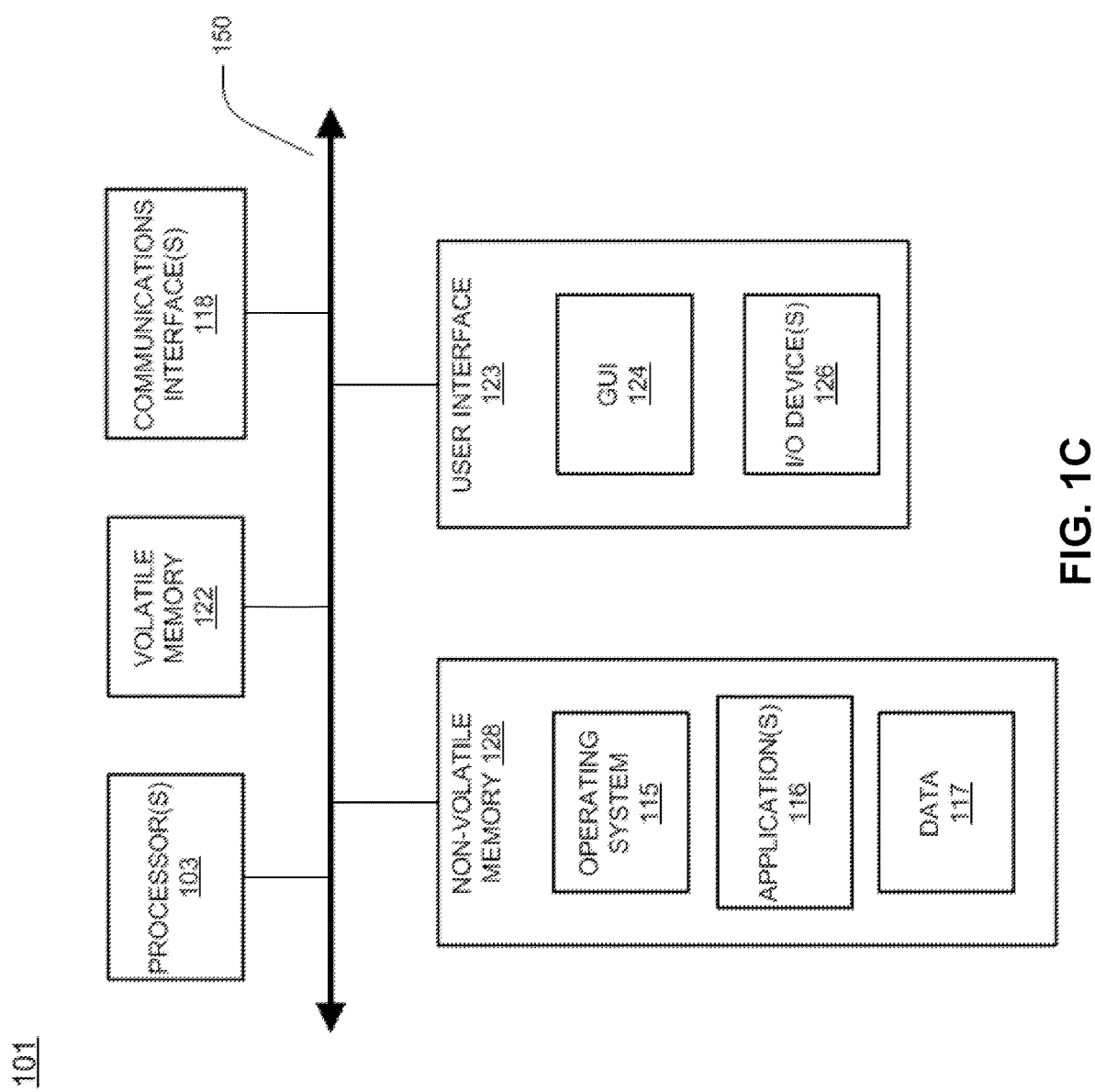
FIG. 1C is a block diagram of a computing device, in accordance with an illustrative embodiment.

As shown in FIG. 1C, computer 101 may include one or more processors 103, volatile memory 122 (e.g., RAM), non-volatile memory 128 (e.g., one or more hard disk drives (HDDs) or other magnetic or optical storage media, one or more solid state drives (SSDs) such as a flash drive or other solid state storage media, one or more hybrid magnetic and solid state drives, and/or one or more virtual storage volumes, such as a cloud storage, or a combination of such physical storage volumes and virtual storage volumes or arrays thereof), user interface (UI) 123, one or more communications interfaces 118, and communication bus 150. User interface 123 may include graphical user interface (GUI) 124 (e.g., a touchscreen, a display, etc.) and one or more input/output (I/O) devices 126 (e.g., a mouse, a keyboard, etc.). Non-volatile memory 128 stores operating system 115, one or more applications 116, and data 117 such that, for example, computer instructions of operating system 115 and/or applications 116 are executed by processor(s) 103 out of volatile memory 122. Data may be entered using an input device of GUI 124 or received from I/O device(s) 126. Various elements of computer 101 may communicate via communication bus 150. Computer 101 as shown in FIG. 1C is shown merely as an example, as clients 102, servers 106 and/or appliances 200 and 205 may be implemented by any computing or processing environment and with any type of machine or set of machines that may have suitable hardware and/or software capable of operating as described herein.

Processor(s) 103 may be implemented by one or more programmable processors executing one or more computer programs to perform the functions of the system. As used herein, the term "processor" describes an electronic circuit that performs a function, an operation, or a sequence of operations. The function, operation, or sequence of operations may be hard coded into the electronic circuit or soft coded by way of instructions held in a memory device. A "processor" may perform the function, operation, or sequence of operations using digital values or using analog signals. In some embodiments, the "processor" can be embodied in one or more application specific integrated circuits (ASICs), microprocessors, digital signal processors, microcontrollers, field programmable gate arrays (FPGAs), programmable logic arrays (PLAs), multi-core processors, or general-purpose computers with associated memory. The "processor" may be analog, digital or mixed-signal. In some embodiments, the "processor" may be one or more physical processors or one or more "virtual" (e.g., remotely located or "cloud") processors.

Communications interfaces 118 may include one or more interfaces to enable computer 101 to access a computer network such as a LAN, a WAN, or the Internet through a variety of wired and/or wireless or cellular connections.

In described embodiments, a first computing device 101 may execute an application on behalf of a user of a client computing device (e.g., a client 102), may execute a virtual machine, which provides an execution session within which applications execute on behalf of a user or a client computing device (e.g., a client 102), such as a hosted desktop session, may execute a terminal services session to provide a hosted desktop environment, or may provide access to a computing environment including one or more of: one or more applications, one or more desktop applications, and one or more desktop sessions in which one or more applications may execute.

Additional details of the implementation and operation of network environment 100, clients 102, servers 106, and appliances 200 and 205 may be as described in U.S. Pat. No. 9,538,345, issued Jan. 3, 2017 to Citrix Systems, Inc. of Fort Lauderdale, Fla., the teachings of which are hereby incorporated herein by reference.

B. Appliance Architecture

Figure 2:
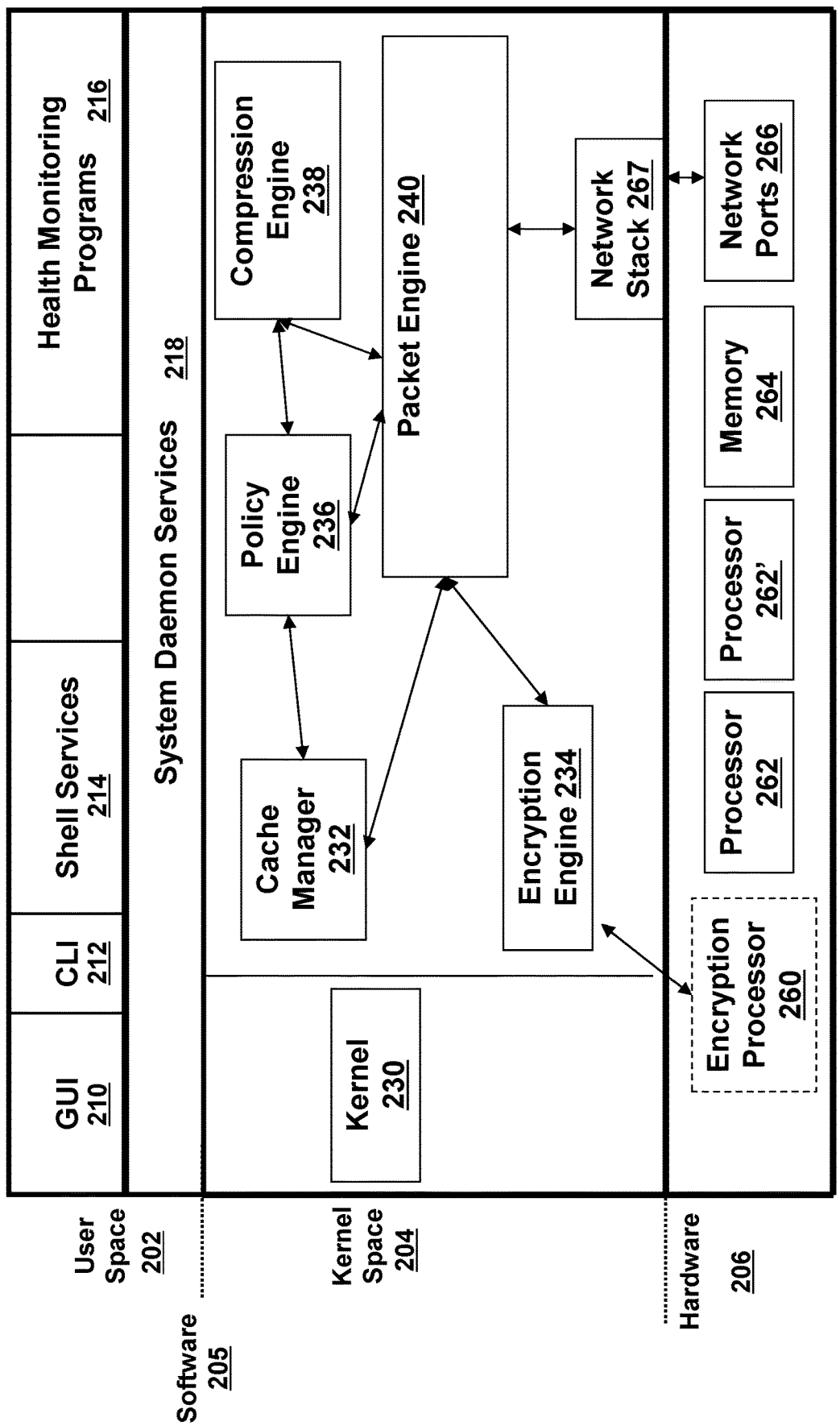
FIG. 2 is a block diagram of an appliance for processing communications between a client and a server, in accordance with an illustrative embodiment.

FIG. 2 shows an example embodiment of appliance 200. As described herein, appliance 200 may be implemented as a server, gateway, router, switch, bridge or other type of computing or network device. As shown in FIG. 2, an embodiment of appliance 200 may include a hardware layer 206 and a software layer 205 divided into a user space 202 and a kernel space 204. Hardware layer 206 provides the hardware elements upon which programs and services within kernel space 204 and user space 202 are executed and allow programs and services within kernel space 204 and user space 202 to communicate data both internally and externally with respect to appliance 200. As shown in FIG. 2, hardware layer 206 may include one or more processing units 262 for executing software programs and services, memory 264 for storing software and data, network ports 266 for transmitting and receiving data over a network, and encryption processor 260 for encrypting and decrypting data such as in relation to Secure Socket Layer (SSL) or Transport Layer Security (TLS) processing of data transmitted and received over the network.

An operating system of appliance 200 allocates, manages, or otherwise segregates the available system memory into kernel space 204 and user space 202. Kernel space 204 is reserved for running kernel 230, including any device drivers, kernel extensions or other kernel related software. As known to those skilled in the art, kernel 230 is the core of the operating system, and provides access, control, and management of resources and hardware-related elements of application 104. Kernel space 204 may also include a number of network services or processes working in conjunction with cache manager 232.

Appliance 200 may include one or more network stacks 267, such as a TCP/IP based stack, for communicating with client(s) 102, server(s) 106, network(s) 104, and/or other appliances 200 or 205. For example, appliance 200 may establish and/or terminate one or more transport layer connections between clients 102 and servers 106. Each network stack 267 may include a buffer 243 for queuing one or more network packets for transmission by appliance 200.

Kernel space 204 may include cache manager 232, packet engine 240, encryption engine 234, policy engine 236 and compression engine 238. In other words, one or more of processes 232, 240, 234, 236 and 238 run in the core address space of the operating system of appliance 200, which may reduce the number of data transactions to and from the memory and/or context switches between kernel mode and user mode, for example since data obtained in kernel mode may not need to be passed or copied to a user process, thread or user level data structure.

Cache manager 232 may duplicate original data stored elsewhere or data previously computed, generated or transmitted to reducing the access time of the data. In some embodiments, the cache memory may be a data object in memory 264 of appliance 200, or may be a physical memory having a faster access time than memory 264.

Policy engine 236 may include a statistical engine or other configuration mechanism to allow a user to identify, specify, define or configure a caching policy and access, control and management of objects, data or content being cached by appliance 200, and define or configure security, network traffic, network access, compression or other functions performed by appliance 200.

Encryption engine 234 may process any security related protocol, such as SSL or TLS. For example, encryption engine 234 may encrypt and decrypt network packets, or any portion thereof, communicated via appliance 200, may setup or establish SSL, TLS or other secure connections, for example between client 102, server 106, and/or other appliances 200 or 205. In some embodiments, encryption engine 234 may use a tunneling protocol to provide a VPN between a client 102 and a server 106. In some embodiments, encryption engine 234 is in communication with encryption processor 260. Compression engine 238 compresses network packets bi-directionally between clients 102 and servers 106 and/or between one or more appliances 200.

Packet engine 240 may manage kernel-level processing of packets received and transmitted by appliance 200 via network stacks 267 to send and receive network packets via network ports 266. Packet engine 240 may operate in conjunction with encryption engine 234, cache manager 232, policy engine 236 and compression engine 238, for example to perform encryption/decryption, traffic management such as request-level content switching and request-level cache redirection, and compression and decompression of data.

User space 202 is a memory area or portion of the operating system used by user mode applications or programs otherwise running in user mode. A user mode application may not access kernel space 204 directly and uses service calls in order to access kernel services. User space 202 may include graphical user interface (GUI) 210, a command line interface (CLI) 212, shell services 214, health monitor 216, and daemon services 218. GUI 210 and CLI 212 enable a system administrator or other user to interact with and control the operation of appliance 200, such as via the operating system of appliance 200. Shell services 214 include the programs, services, tasks, processes or executable instructions to support interaction with appliance 200 by a user via the GUI 210 and/or CLI 212.

Health monitor 216 monitors, checks, reports and ensures that network systems are functioning properly and that users are receiving requested content over a network, for example by monitoring activity of appliance 200. In some embodiments, health monitor 216 intercepts and inspects any network traffic passed via appliance 200. For example, health monitor 216 may interface with one or more of encryption engine 234, cache manager 232, policy engine 236, compression engine 238, packet engine 240, daemon services 218, and shell services 214 to determine a state, status, operating condition, or health of any portion of the appliance 200. Further, health monitor 216 may determine if a program, process, service or task is active and currently running, check status, error or history logs provided by any program, process, service or task to determine any condition, status or error with any portion of appliance 200. Additionally, health monitor 216 may measure and monitor the performance of any application, program, process, service, task or thread executing on appliance 200.

Daemon services 218 are programs that run continuously or in the background and handle periodic service requests received by appliance 200. In some embodiments, a daemon service may forward the requests to other programs or processes, such as another daemon service 218 as appropriate.

As described herein, appliance 200 may relieve servers 106 of much of the processing load caused by repeatedly opening and closing transport layers connections to clients 102 by opening one or more transport layer connections with each server 106 and maintaining these connections to allow repeated data accesses by clients via the Internet (e.g., "connection pooling"). To perform connection pooling, appliance 200 may translate or multiplex communications by modifying sequence numbers and acknowledgment numbers at the transport layer protocol level (e.g., "connection multiplexing"). Appliance 200 may also provide switching or load balancing for communications between the client 102 and server 106.

As described herein, each client 102 may include client agent 120 for establishing and exchanging communications with appliance 200 and/or server 106 via a network 104. Client 102 may have installed and/or execute one or more applications that are in communication with network 104. Client agent 120 may intercept network communications from a network stack used by the one or more applications. For example, client agent 120 may intercept a network communication at any point in a network stack and redirect the network communication to a destination desired, managed or controlled by client agent 120, for example to intercept and redirect a transport layer connection to an IP address and port controlled or managed by client agent 120. Thus, client agent 120 may transparently intercept any protocol layer below the transport layer, such as the network layer, and any protocol layer above the transport layer, such as the session, presentation or application layers. Client agent 120 can interface with the transport layer to secure, optimize, accelerate, route or load-balance any communications provided via any protocol carried by the transport layer.

In some embodiments, client agent 120 is implemented as an Independent Computing Architecture (ICA) client developed by Citrix Systems, Inc. of Fort Lauderdale, Fla. Client agent 120 may perform acceleration, streaming, monitoring, and/or other operations. For example, client agent 120 may accelerate streaming an application from a server 106 to a client 102. Client agent 120 may also perform end-point detection/scanning and collect end-point information about client 102 for appliance 200 and/or server 106. Appliance 200 and/or server 106 may use the collected information to determine and provide access, authentication and authorization control of the client's connection to network 104. For example, client agent 120 may identify and determine one or more client-side attributes, such as: the operating system and/or a version of an operating system, a service pack of the operating system, a running service, a running process, a file, presence or versions of various applications of the client, such as antivirus, firewall, security, and/or other software.

Additional details of the implementation and operation of appliance 200 may be as described in U.S. Pat. No. 9,538, 345, issued Jan. 3, 2017 to Citrix Systems, Inc. of Fort Lauderdale, Fla., the teachings of which are hereby incorporated herein by reference.

C. Systems and Methods for Providing Virtualized Application Delivery Controller Referring now to FIG. 3, a block diagram of a virtualized environment 300 is shown. As shown, a computing device 302 in virtualized environment 300 includes a virtualization layer 303, a hypervisor layer 304, and a hardware layer 307. Hypervisor layer 304 includes one or more hypervisors (or virtualization managers) 301 that allocates and manages access to a number of physical resources in hardware layer 307 (e.g., physical processor(s) 321 and physical disk(s) 328) by at least one virtual machine (VM) (e.g., one of VMs 306) executing in virtualization layer 303. Each VM 306 may include allocated virtual resources such as virtual processors 332 and/or virtual disks 342, as well as virtual resources such as virtual memory and virtual network interfaces. In some embodiments, at least one of VMs 306 may include a control operating system (e.g., 305) in communication with hypervisor 301 and used to execute applications for managing and configuring other VMs (e.g., guest operating systems 310) on device 302.

In general, hypervisor(s) 301 may provide virtual resources to an operating system of VMs 306 in any manner that simulates the operating system having access to a physical device. Thus, hypervisor(s) 301 may be used to emulate virtual hardware, partition physical hardware, virtualize physical hardware, and execute virtual machines that provide access to computing environments. In an illustrative embodiment, hypervisor(s) 301 may be implemented as a XEN hypervisor, for example as provided by the open source Xen.org community. In an illustrative embodiment, device 302 executing a hypervisor that creates a virtual machine platform on which guest operating systems may execute is referred to as a host server. In such an embodiment, device 302 may be implemented as a XEN server as provided by Citrix Systems, Inc., of Fort Lauderdale, Fla.

Hypervisor 301 may create one or more VMs 306 in which an operating system (e.g., control operating system 305 and/or guest operating system 310) executes. For example, the hypervisor 301 loads a virtual machine image to create VMs 306 to execute an operating system. Hypervisor 301 may present VMs 306 with an abstraction of hardware layer 307, and/or may control how physical capabilities of hardware layer 307 are presented to VMs 306. For example, hypervisor(s) 301 may manage a pool of resources distributed across multiple physical computing devices.

In some embodiments, one of VMs 306 (e.g., the VM executing control operating system 305) may manage and configure other of VMs 306, for example by managing the execution and/or termination of a VM and/or managing allocation of virtual resources to a VM. In various embodiments, VMs may communicate with hypervisor(s) 301 and/ or other VMs via, for example, one or more Application Programming Interfaces (APIs), shared memory, and/or other techniques.

In general, VMs 306 may provide a user of device 302 with access to resources within virtualized computing environment 300, for example, one or more programs, applications, documents, files, desktop and/or computing environments, or other resources. In some embodiments, VMs 306 may be implemented as fully virtualized VMs that are not aware that they are virtual machines (e.g., a Hardware Virtual Machine or HVM). In other embodiments, the VM may be aware that it is a virtual machine, and/or the VM may be implemented as a paravirtualized (PV) VM.

Figure 3:
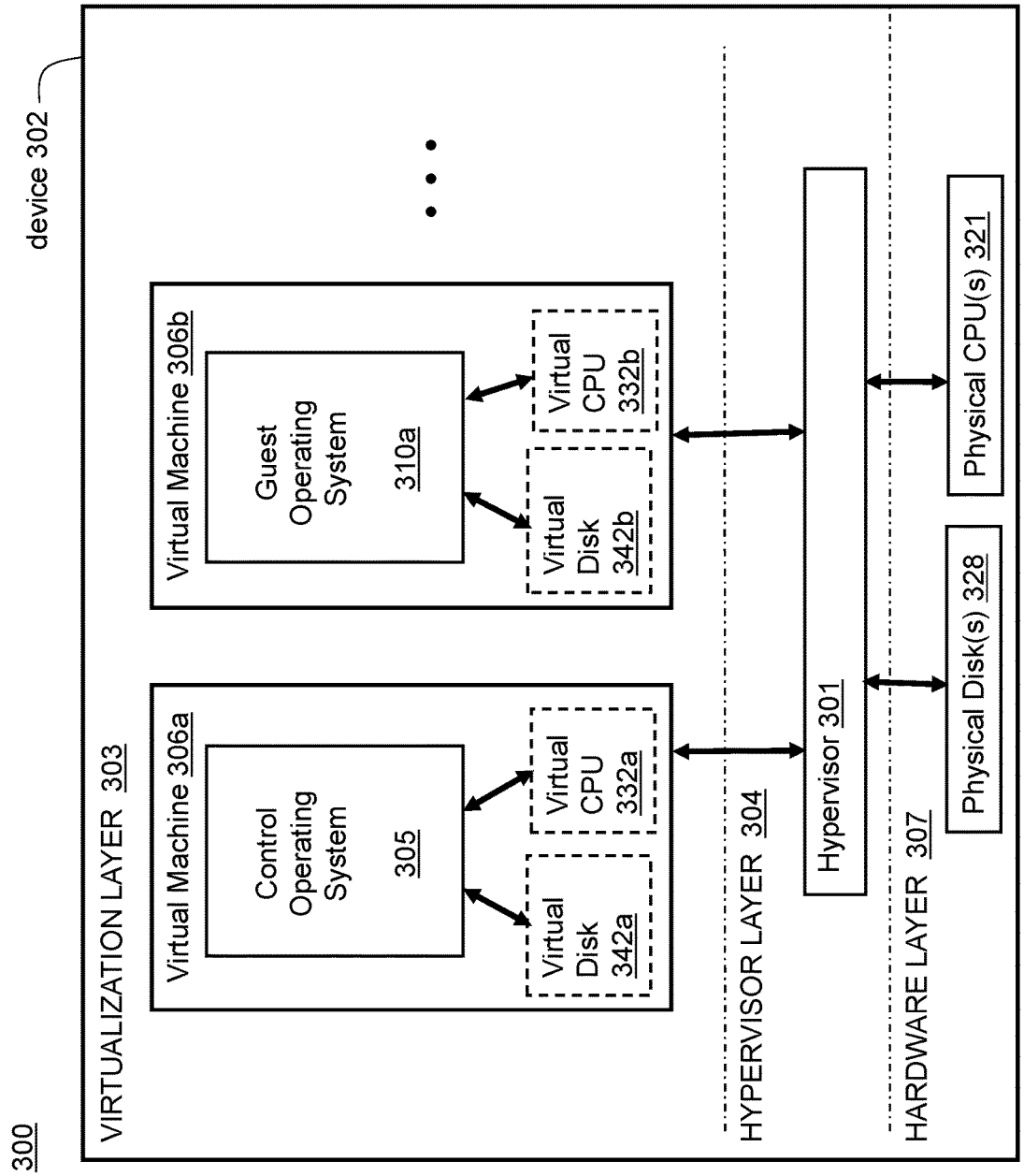
FIG. 3 is a block diagram of a virtualization environment, in accordance with an illustrative embodiment.

Although shown in FIG. 3 as including a single virtualized device 302, virtualized environment 300 may include a plurality of networked devices in a system in which at least one physical host executes a virtual machine. A device on which a VM executes may be referred to as a physical host and/or a host machine. For example, appliance 200 may be additionally or alternatively implemented in a virtualized environment 300 on any computing device, such as a client 102, server 106 or appliance 200. Virtual appliances may provide functionality for availability, performance, health monitoring, caching and compression, connection multiplexing and pooling and/or security processing (e.g., firewall, VPN, encryption/decryption, etc.), similarly as described in regard to appliance 200.

Additional details of the implementation and operation of virtualized computing environment 300 may be as described in U.S. Pat. No. 9,538,345, issued Jan. 3, 2017 to Citrix Systems, Inc. of Fort Lauderdale, Fla., the teachings of which are hereby incorporated herein by reference.

In some embodiments, a server may execute multiple virtual machines 306, for example on various cores of a multi-core processing system and/or various processors of a multiple processor device. For example, although generally shown herein as "processors" (e.g., in FIGS. 1C, 2 and 3), one or more of the processors may be implemented as either single- or multi-core processors to provide a multi-threaded, parallel architecture and/or multi-core architecture. Each processor and/or core may have or use memory that is allocated or assigned for private or local use that is only accessible by that processor/core, and/or may have or use memory that is public or shared and accessible by multiple processors/cores. Such architectures may allow work, task, load or network traffic distribution across one or more processors and/or one or more cores (e.g., by functional parallelism, data parallelism, flow-based data parallelism, etc.).

Further, instead of (or in addition to) the functionality of the cores being implemented in the form of a physical processor/core, such functionality may be implemented in a virtualized environment (e.g., 300) on a client 102, server 106 or appliance 200, such that the functionality may be implemented across multiple devices, such as a cluster of computing devices, a server farm or network of computing devices, etc. The various processors/cores may interface or communicate with each other using a variety of interface techniques, such as core to core messaging, shared memory, kernel APIs, etc.

In embodiments employing multiple processors and/or multiple processor cores, described embodiments may distribute data packets among cores or processors, for example to balance the flows across the cores. For example, packet distribution may be based upon determinations of functions performed by each core, source and destination addresses, and/or whether: a load on the associated core is above a predetermined threshold; the load on the associated core is below a predetermined threshold; the load on the associated core is less than the load on the other cores; or any other metric that can be used to determine where to forward data packets based in part on the amount of load on a processor.

For example, data packets may be distributed among cores or processes using receive-side scaling (RSS) in order to process packets using multiple processors/cores in a network. RSS generally allows packet processing to be balanced across multiple processors/cores while maintaining in-order delivery of the packets. In some embodiments, RSS may use a hashing scheme to determine a core or processor for processing a packet.

The RSS may generate hashes from any type and form of input, such as a sequence of values. This sequence of values can include any portion of the network packet, such as any header, field or payload of network packet, and include any tuples of information associated with a network packet or data flow, such as addresses and ports. The hash result or any portion thereof may be used to identify a processor, core, engine, etc., for distributing a network packet, for example via a hash table, indirection table, or other mapping technique.

Additional details of the implementation and operation of a multi-processor and/or multi-core system may be as described in U.S. Pat. No. 9,538,345, issued Jan. 3, 2017 to Citrix Systems, Inc. of Fort Lauderdale, Fla., the teachings of which are hereby incorporated herein by reference.

D. Systems and Methods for Providing a Distributed Cluster Architecture

Figure 4:
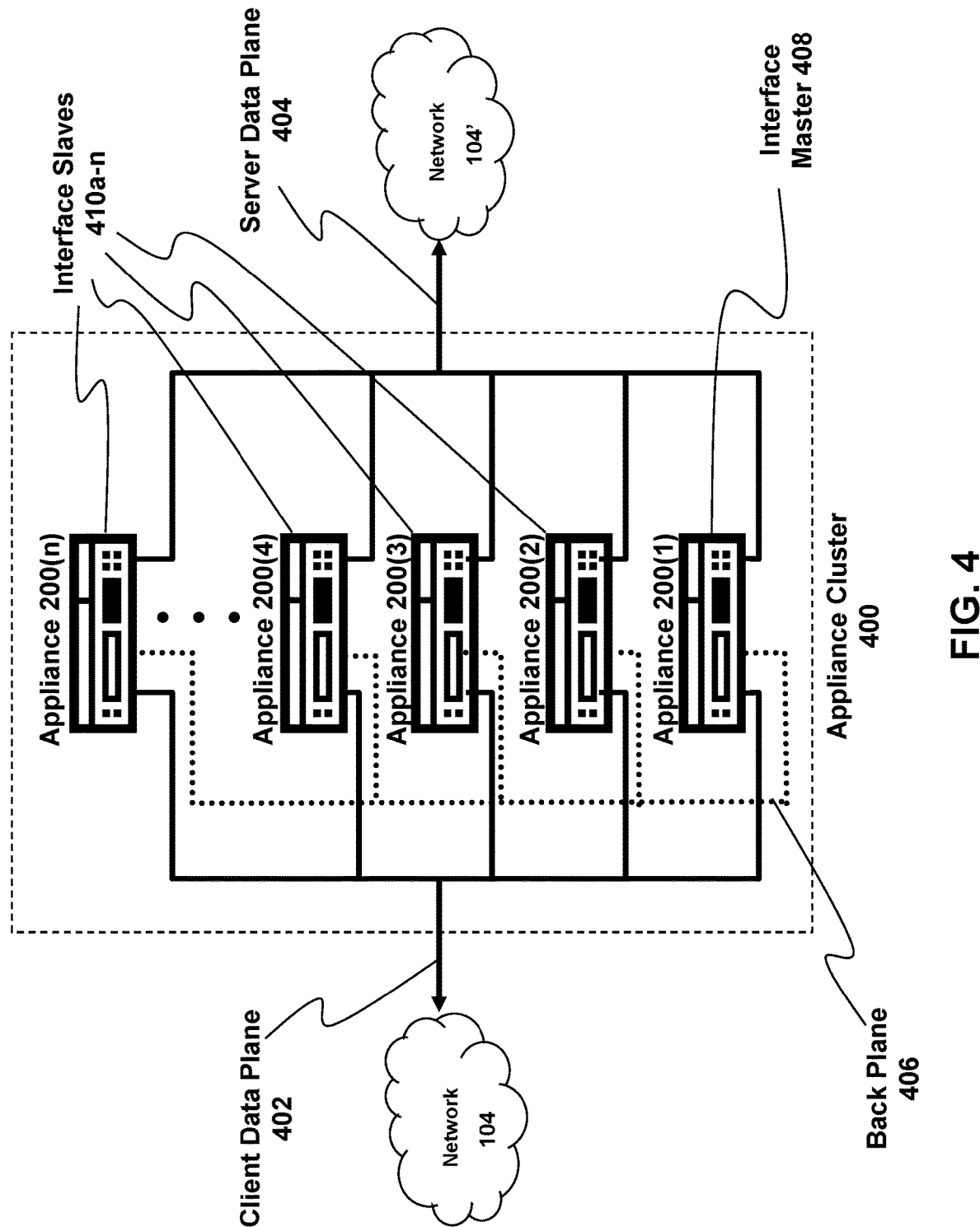
FIG. 4 is a block diagram of a cluster system, in accordance with an illustrative embodiment.

Although shown in FIGS. 1A and 1B as being single appliances, appliances 200 may be implemented as one or more distributed or clustered appliances. Individual computing devices or appliances may be referred to as nodes of the cluster. A centralized management system may perform load balancing, distribution, configuration, or other tasks to allow the nodes to operate in conjunction as a single computing system. Such a cluster may be viewed as a single virtual appliance or computing device. FIG. 4 shows a block diagram of an illustrative computing device cluster or appliance cluster 400. A plurality of appliances 200 or other computing devices (e.g., nodes) may be joined into a single cluster 400. Cluster 400 may operate as an application server, network storage server, backup service, or any other type of computing device to perform many of the functions of appliances 200 and/or 205.

In some embodiments, each appliance 200 of cluster 400 may be implemented as a multi-processor and/or multi-core appliance, as described herein. Such embodiments may employ a two-tier distribution system, with one appliance if the cluster distributing packets to nodes of the cluster, and each node distributing packets for processing to processors/cores of the node. In many embodiments, one or more of appliances 200 of cluster 400 may be physically grouped or geographically proximate to one another, such as a group of blade servers or rack mount devices in a given chassis, rack, and/or data center. In some embodiments, one or more of appliances 200 of cluster 400 may be geographically distributed, with appliances 200 not physically or geographically co-located. In such embodiments, geographically remote appliances may be joined by a dedicated network connection and/or VPN. In geographically distributed embodiments, load balancing may also account for communications latency between geographically remote appliances.

In some embodiments, cluster 400 may be considered a virtual appliance, grouped via common configuration, management, and purpose, rather than as a physical group. For example, an appliance cluster may comprise a plurality of virtual machines or processes executed by one or more servers.

As shown in FIG. 4, appliance cluster 400 may be coupled to a first network 104(1) via client data plane 402, for example to transfer data between clients 102 and appliance cluster 400. Client data plane 402 may be implemented a switch, hub, router, or other similar network device internal or external to cluster 400 to distribute traffic across the nodes of cluster 400. For example, traffic distribution may be performed based on equal-cost multi-path (ECMP) routing with next hops configured with appliances or nodes of the cluster, open-shortest path first (OSPF), stateless hash-based traffic distribution, link aggregation (LAG) protocols, or any other type and form of flow distribution, load balancing, and routing.

Appliance cluster 400 may be coupled to a second network 104(2) via server data plane 404. Similarly to client data plane 402, server data plane 404 may be implemented as a switch, hub, router, or other network device that may be internal or external to cluster 400. In some embodiments, client data plane 402 and server data plane 404 may be merged or combined into a single device.

In some embodiments, each appliance 200 of cluster 400 may be connected via an internal communication network or backplane 406. Backplane 406 may enable inter-node or inter-appliance control and configuration messages, for inter-node forwarding of traffic, and/or for communicating configuration and control traffic from an administrator or user to cluster 400. In some embodiments, backplane 406 may be a physical network, a VPN or tunnel, or a combination thereof.

Additional details of cluster 400 may be as described in U.S. Pat. No. 9,538,345, issued Jan. 3, 2017 to Citrix Systems, Inc. of Fort Lauderdale, Fla., the teachings of which are hereby incorporated herein by reference.

E. Systems and Methods for Performing Compression of Data in a Queue

The present disclosure is directed to systems and methods for performing compression of data in a queue. With an intermediary device deployed between a client and a server, it may difficult to apply processing or optimization techniques on data packets passed through the intermediary device while ensuring that no latency is introduced. For example, accumulation of packets received at the intermediary device for compression may lead or contribute to jitter and latency. Processing 10 milliseconds worth of packets at the intermediary device for instance may result in the introduction of an additional 10 millisecond of jitter for subsequently processed packets. As the amount of packets received at the intermediary device may dynamically vary, the compression process may cause variations in packet delay over time. This variance may be particularly problematic, with the scenario of multiple intermediary devices deployed between the client and the server which can introduce jitter or latency to packets communicated between the client and the server.

By dynamically selecting a subset amount of packets to be processed using optimization techniques such as compression, the present systems and methods may reduce or avoid jitter of network traffic passing through the intermediary device. The intermediary device may maintain a queue to accumulate or buffer data from multiple sources or linked devices. For example, the intermediary device may receive data from clients or servers via one network (e.g., a local area network (LAN)) and may receive data from other intermediary devices also deployed between the clients and the servers via another network (e.g., a wide area network (WAN)). The data from each source may be transmitted and/or received at a rate different from that of data from other sources (e.g., time delays t, u, and v). The data in the queue may be offloaded, transferred and/or transmitted at various rates to a plurality of data sinks (e.g., time delays t, u, and v), which can comprise data links or packet processing modules/devices. The amount of time then in processing the last packet in the queue may correspond to a quotient or function of the accumulated queue size (Q) and the sum of data rates from the multiple sinks (e.g., t, u, and v). If one of these data sinks (e.g., v) fails or is determined to be inefficient in transferring data from the queue, the amount of time in processing the packets queued at the intermediary device may increase $$\left(\text{e.g., from}\frac{Q}{t+u+v}\text{ seconds to }\frac{Q}{t+u}\text{ seconds}\right),$$

thereby introducing or causing increased latency, delay or jitter in the queue.

To reduce and/or eliminate packet delay variation arising from applying optimization techniques such as compression, the intermediary device may constrain, manage or perform such optimization techniques (e.g., compression, encryption, and de-duplication)) by determining the amount of packets accumulated in the queue. To determine the subset of packets, the intermediary device may track, monitor or sample the accumulated number of packets (e.g., via the position of one or more pointers, to first packet and last packet in the queue for instance) to calculate an estimated amount of time to process the packets $$\left(\text{e.g., }\frac{Q}{t+u+v}\text{ seconds}\right).$$

The intermediary device may compare the estimated amount of time or the accumulated number/amount of packets, with a minimum threshold time or packet amount. If the estimated amount of time to process the packets (or the accumulated number/amount of packets) is greater than the minimum threshold time (or the threshold packet amount), the intermediary device may select a subset of packets in the queue (e.g., after taking into account a compression cycle) subsequent to the minimum threshold time, for compression. The compression cycle may correspond to an amount of time that the intermediary device consumes in compressing the selected subset of packets. For instance, packets in the queue prior to the compression cycle subsequent to the minimum threshold time may remain uncompressed, and may be allowed to be sent from queue to one or more data sinks without compression. The intermediary device may reserve a first portion of the queue for buffering the compressed data, for example beyond the compression cycle subsequent to the minimum threshold time, and may also set aside a second portion of the queue beyond the first portion for queuing or buffering incoming coming data. By reserving the two portions of the queues in this manner, the intermediary device may perform compression and/or other optimization techniques while additional packets arrive into the queue, thereby reducing and/or eliminating jitter and other delays from processing the entire queue. Although the above example was described in the context of compression, the same concepts can be applied to other optimization techniques or type of packet processing.

Figure 5A:
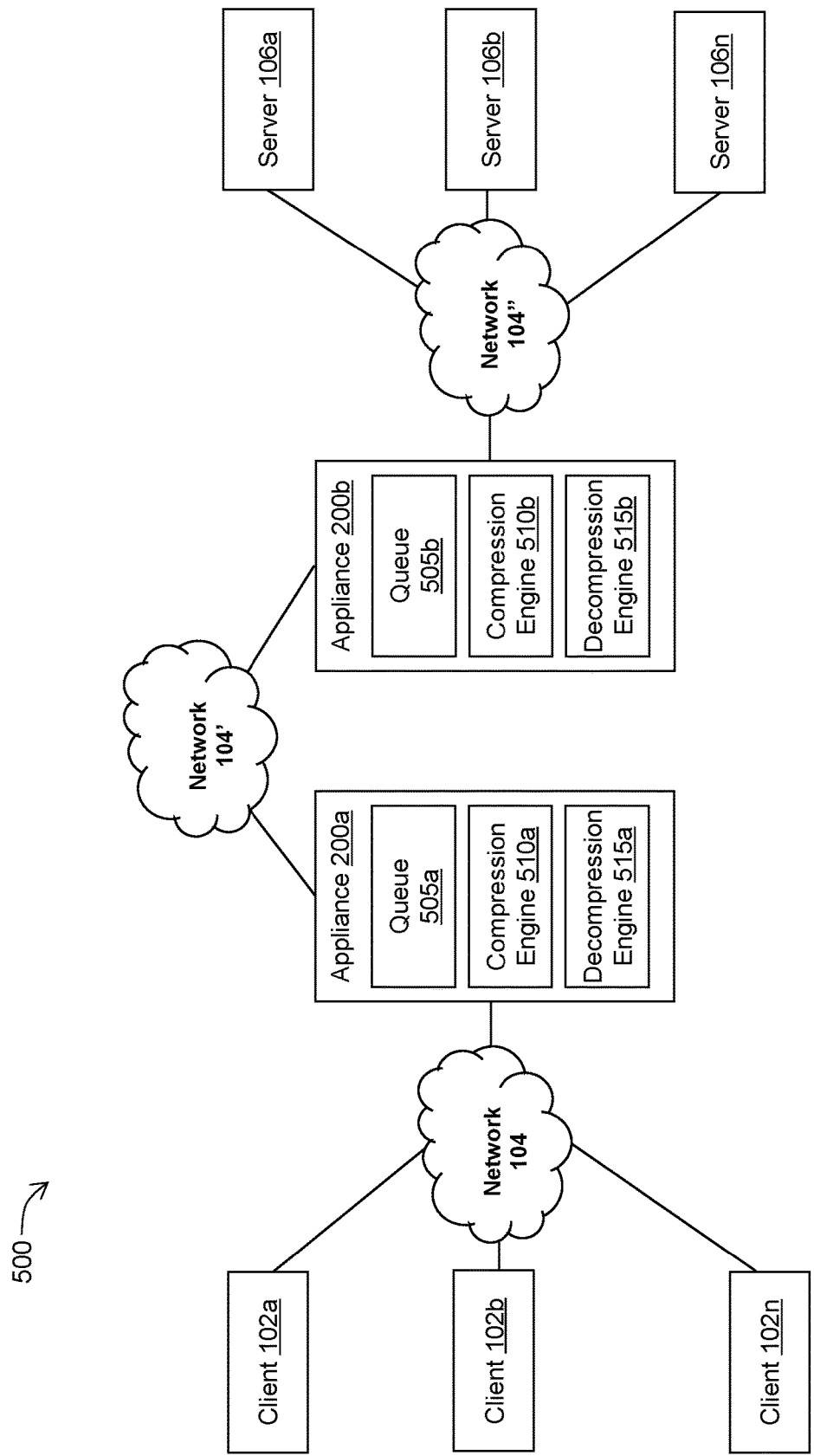
FIG. 5A is a block diagram of a system for performing compression of data in a queue, in accordance with an illustrative embodiment.

Referring now to FIG. 5A, depicted is a block diagram of an embodiment of a system 505 for performing compression of data in a queue. In brief summary, the system 505 may include a plurality of client devices 102a-n, one or more appliances 200a-n (e.g., a first appliance 200a and a second appliance 200b as shown), and a plurality of servers 106a-n. The client-side facing appliances 200a-n (e.g., the first appliance 200a) may be communicatively connected to the one or more clients 102a-n via network 104. The server-side appliances 200a-n (e.g., the second appliance 200b) may be communicatively connected to the one or more servers 106a-n via network 104". The client-side facing appliances 200a-n (e.g., the first appliance 200a) and the server-side facing appliances 200a-n (e.g., the second appliance 200b) may be communicatively connected to one another via network 104'. In some embodiments, there may be one or more communication links via the network 104' connecting the client-side facing appliances 200a-n (e.g., the first appliance 200a) and the server-side facing appliances 200a-n (e.g., the second appliance 200b). The networks 104 and 104" may be local area networks (LAN), whereas the network 104' may be a wide area network (WAN) for example.

Each appliance 200a-n may comprise features of any embodiment of the devices 200, described above in connection with at least FIGS. 1A-1C, 2, and 4. Each of the above-mentioned elements or entities is implemented in hardware, or a combination of hardware and software, in one or more embodiments. For instance, each of these elements or entities can include any application, program, library, script, task, service, process or any type and form of executable instructions executing on hardware of the device 200. The hardware includes circuitry such as one or more processors in one or more embodiments.

The systems and methods of the present solution may be implemented in any type and form of device, including clients, servers and appliances 200. As referenced herein, a "server" may sometimes refer to any device in a client-server relationship, e.g., an appliance 200 in a handshake with a client device 102a-n. The present systems and methods may be implemented in any intermediary device or gateway, such as any embodiments of the appliance or devices 200 described herein. Some portion of the present systems and methods may be implemented as part of a packet processing engine and/or virtual server of an appliance, for instance. The systems and methods may be implemented in any type and form of environment, including multi-core appliances, virtualized environments and/or clustered environments described herein.

The first appliance 200a may include a queue 505a, a compression engine 510a, and a decompression engine 515a, among others. The second appliance 200b also may include a queue 505b, a compression engine 510b, and a decompression engine 515b, among others. The queue 505a of the first appliance 200a may include similar functionalities as the queue 505b of the second appliance 200b. The compression engine 510a of the first appliance 200a may include similar functionalities as the compression engine 510b of the second appliance 200b. The decompression engine 515a of the first appliance 200a may include similar functionalities as the decompression engine 515b of the second appliance 200b. Each of the one or more appliances 200a-n may include a queue, a compression engine, and a decompression engine, among others, with similar functionalities as the first appliance 200a and the second appliance 200b. In some embodiments, the compression engine may perform encryption and/or de-duplication functions and the decompression engine may perform decryption and/or re-duplication functions in conjunction with compression and/or decompression. The functionalities of the queue, the compression engine, and the decompression engine are detailed herein below.

Turning attention to the first appliance 200a, the queue 505a may maintain, buffer, accumulate, or otherwise store data received from the one or more clients 102a-n and/or the one or more servers 106a-n. In some embodiments, the queue 505a may maintain, accumulate, or otherwise store data received from other appliances 200a-n (e.g., the second appliance 200b). In some embodiments, the data maintained in the queue 505a may include data to be moved to the one or more links for transferring or processing between the one or more clients 102a-n and the one or more servers 106a-n. The one or more links for transferring or processing between the one or more clients 102a-n and the one or more servers 106a-n may be through two or more appliances 200a-n. In some embodiments, the one or more links for transferring or processing between the one or more clients 102a-n and the one or more servers 106a-n may be through the network 104' connecting the two or more appliances 200a-n.

To alleviate or eliminate jitter or packet delay variation in compressing packets, the compression engine 510a executed on the first appliance 200a may determine whether a length of time for moving the existing data maintained in the queue 505a exceeds a threshold. In some embodiments, the threshold may be a length of time pre-specified to a percentage or fraction of a queue capacity of the queue 505a, or determined according to the data/packet rate of one or more data sinks and/or one or more data sources, compression rate or capacity of the intermediary device, and/or average time(s) for a packet to be held in the queue, according to historical or real time information for example. The threshold may be set or marked relative to the start point or beginning of the queue. The queue capacity may correspond to an amount of time for processing the maximum number of packets that the queue 505a may store. The queue capacity may also correspond to an amount of time for processing the maximum amount of data that the queue 505a may maintain. In some embodiments, the threshold may be set to at least one compression cycle. The compression cycle may correspond to a minimal time (or an average, expected or maximum time) consumed by the engine 510a to perform operations on data (e.g., compression, encryption, and/or de-duplication). In some embodiments, the threshold may be set to a multiple or some other function of one compression cycle.

The compression engine 510a may also dynamically set or determine the threshold (e.g., as some percentage or other function of the queue capacity of the queue 505a). For example, the compression engine 510a may set or change the threshold to 25% of the queue capacity, then three compression cycles, and then 0.5 milliseconds over time. The threshold may be dynamically set or determined based on any number of factors, such as a number of sources and/or sinks for the data maintained in the queue 505a (e.g., the one or more clients 102a-n, the one or more servers 106a-n, and other appliances 200b-n), computing resources on the appliance 200a (e.g., processor usage, processing time, memory usage, power consumption, etc.), and/or network resources (e.g., bandwidth, latency, throughput, and other parameters resources at the networks 104, 104', and 104"), among others. In some embodiments, the compression engine 510a may identify the number of sources and/or sinks for the data maintained in the queue 505a in determining the threshold. In some embodiments, the compression engine 510a may identify the computing resources at the appliance 200a to dynamically set the threshold. In some embodiments, the compression engine 510a may perform one or more network performance tests on the networks 104, 104', and 104" to determine network resources available to the appliance 200a for dynamically setting the threshold. Using these factors, the compression engine 510a may dynamically set or determine the threshold for designating a subset of data stored in the queue 505a to undergo one or more of the optimization techniques.

To determine the length of time for moving the existing data maintained in the queue 505a, the compression engine 510a may sample the existing data maintained in the queue 505a. The compression engine 510a may identify a number of packets stored or remaining in the queue 505a. In some embodiments, the compression engine 510a may identify a size (e.g., in bytes) of the number of packets maintained in the queue 505a. In some embodiments, the compression engine 510a may identify a rate of data outgoing to each data sink or link, and/or incoming data from each source (e.g., the one or more clients 102a-n, the one or more servers 106a-n, and/or other appliances 200b-n). The compression engine 510a may then calculate the length of time for moving the existing data maintained in the queue 505a based on the number of packets in the queue 505a and the rates of incoming and/or outgoing data for instance. In some embodiments, the compression engine 510a may calculate a quotient of the size of the number of packets maintained in the queue 505a and a sum of the rates of data outgoing to the one or more data sinks to determine the length of time for moving the existing data out of the queue. In some embodiments, the compression engine 510a may calculate a quotient of the size of the number of packets maintained in the queue 505a and a sum of the rates of the incoming and/or outgoing data from the one or more sources to determine the length of time for moving the existing data. Once calculated, the compression engine 510a may compare the length of time for moving the existing data in the queue 505a, to the threshold.

If the length of time for moving the existing data maintained in the queue 505a is determined not to exceed the threshold, the compression engine 510a may determine not to apply the respective optimization technique(s) to the existing data in the queue 505a and may continue to add incoming data onto the queue 505a. The compression engine 510a may also wait for additional data to arrive at the appliance 200a until the existing data does exceed the threshold, and repeat the comparison detailed above. By waiting in this manner, the compression engine 510a may accumulate the additional data prior to application of the optimization technique(s), and thus may reduce consumption of computing resources at the appliance 200a.

If the length of time for moving the existing data maintained in the queue 505a is determined to exceed the threshold, the compression engine 510a may identify a quantity of the existing data in the queue 505a to undergo compression and/or other optimization techniques such as encryption and de-duplication among others. The quantity to undergo optimization techniques may correspond to a length of time corresponding to a subset of packets maintained in the queue 505a to be processed using the optimization technique. In some embodiments, the subset may include the existing data maintained in the queue 505a subsequent to the threshold. In some embodiments, the subset may include the existing data maintained in the queue 505a subsequent to a processing cycle(s) set or assumed to be initiated at the start of the queue 505a. The processing cycle may correspond to a compression cycle, an encryption/decryption cycle, and de-duplication cycle among others, corresponding to the amount of time consumed to process the subset of data. In some embodiments, the subset may include the existing data maintained in the queue 505a subsequent to the threshold plus a processing cycle corresponding to the amount of time consumed in processing the selected subset of data in accordance with the optimization techniques. To obtain the subset, the compression engine 510a may determine a portion of the expected length of time for moving the data out of the queue 505a, that exceeds the threshold. The compression engine 510a may subtract a length of time (as measured relative to moving the data out of the queue 505a) corresponding to the data to which the optimization technique is to be applied (e.g., a processing cycle) from the determined portion to obtain a remaining length of time corresponding to the subset. In some embodiments, the compression engine 510a may identify the quantity of data to undergo compression, responsive to the length of time exceeding the threshold plus at least one processing cycle.

Upon identifying the quantity of the existing data in the queue 505a to undergo optimization techniques, the compression engine 510a may identify a quantity of the existing data in the queue 505a according to a reduction ratio for the respective optimization technique(s). This second quantity may correspond to a quantity of data identified from the queue 505a after application of the respective optimization technique(s). In some embodiments, the reduction ratio may correspond to a compression ratio corresponding to a size, percentage, or proportion of the original existing data after having undergone compression. In some embodiments, the reduction ratio may correspond to an encryption ratio corresponding to a size, percentage, or proportion of the original existing data subsequent to encryption. In some embodiments, the reduction ratio may correspond to a de-duplication ratio corresponding to a size, percentage, or proportion of the original existing data after having undergone de-duplication. Based on the quantity of existing data in the queue 505a to undergo one of the optimization techniques, the compression engine 510a may estimate the quantity of the existing data in the queue 505a to undergo optimization, in accordance to the reduction ratio. In some embodiments, the estimation may be based on a function, such as a mapping or a formula, with the data of the queue 505a to undergo one of the optimization techniques. In some embodiments, the estimation of the quantity of the existing data in the queue 505a subsequent to the application of the respective optimization technique may be based on a fixed multiplicative ratio (e.g., 1:1 to 500:1 reduction ratio).

Figure 5B:
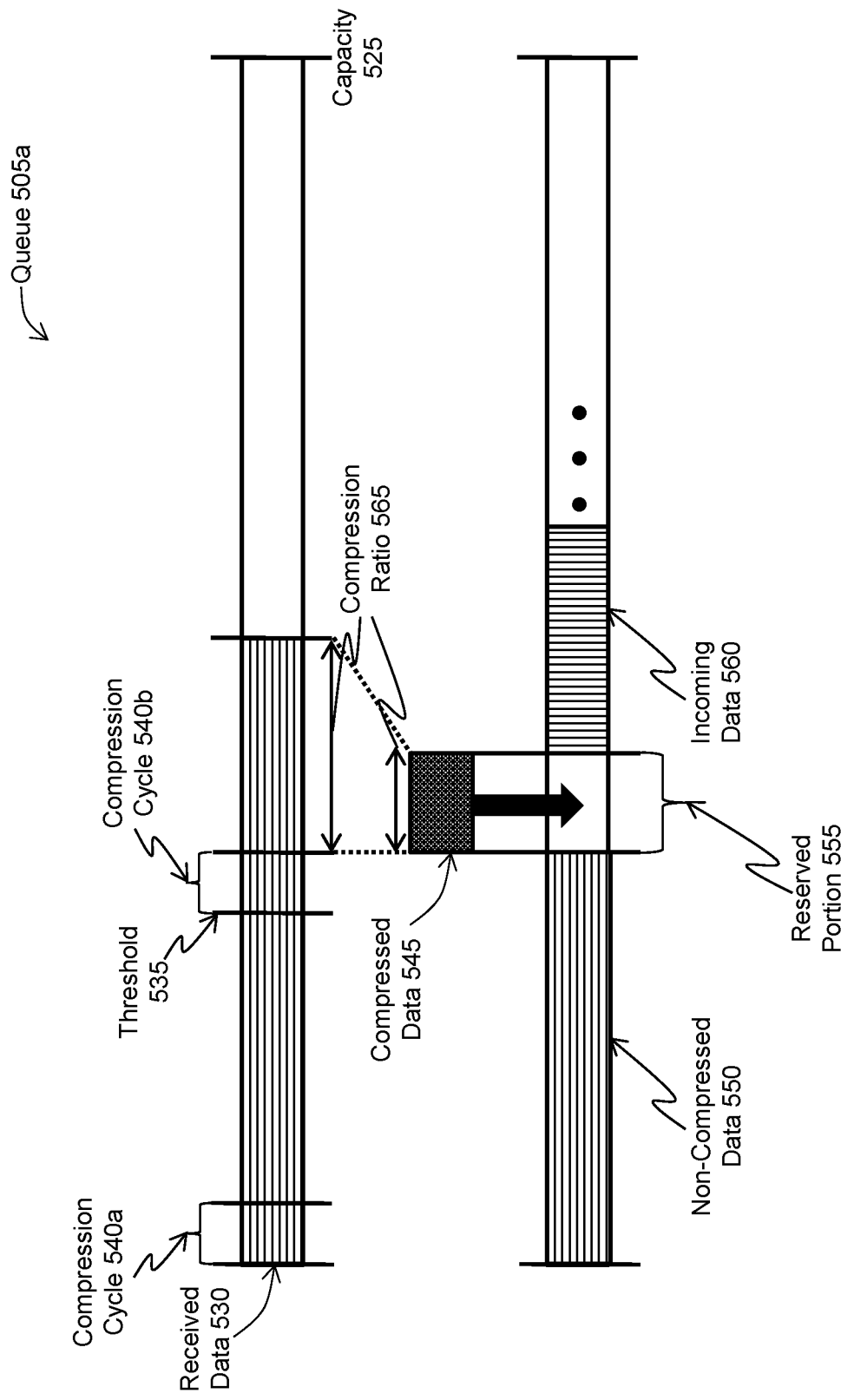
FIGS. 5B-5D are block diagrams of a queue in performing compression of data in accordance with various illustrative embodiments.
Figure 5C:
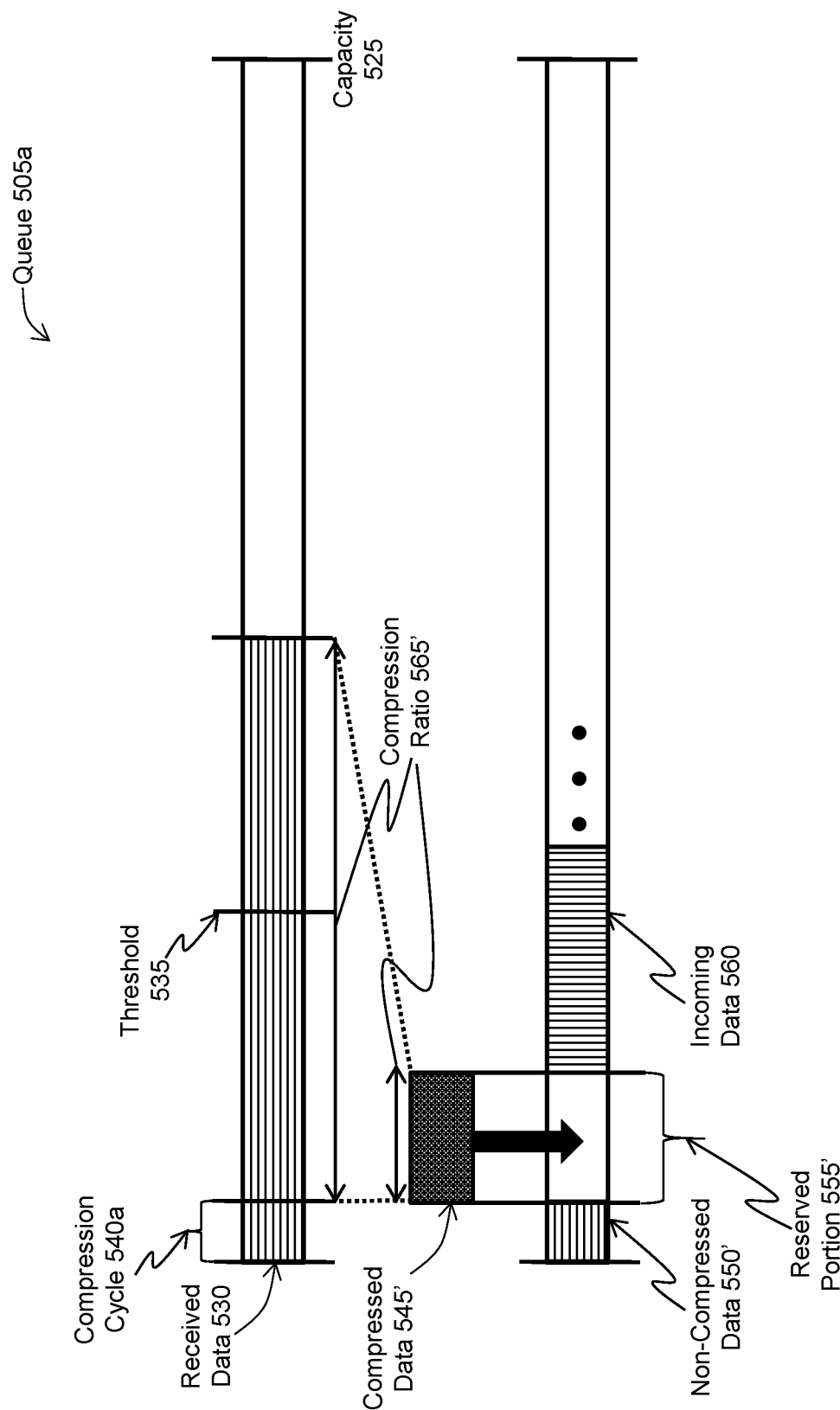
Figure 5D:
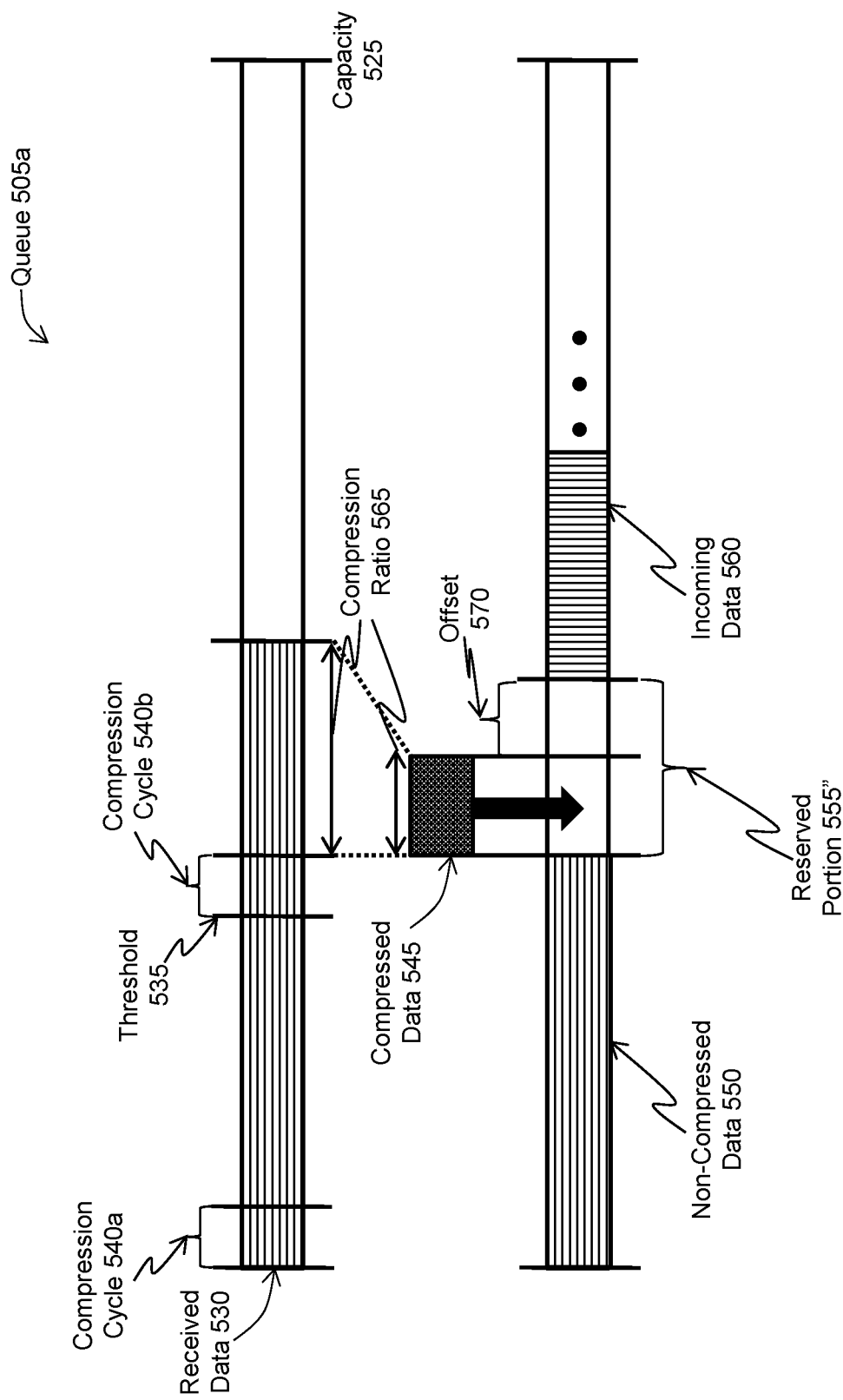

Once the quantity of the existing data to undergo optimization/compression, according to the reduction ratio of the optimization techniques is identified, the compression engine 510a may reserve a portion of the queue 505a to place the data obtained from applying the respective optimization technique(s) on the identified subset of data. The reserved portion may be set aside or designated by the compression engine 510a to maintain the existing data stored in the queue 505a to not undergo the optimization technique(s). The reserved portion may be set aside, selected, or identified by the compression engine 510a based on the threshold, the reduction cycle (e.g., compression ratio, encryption ratio, de-duplication ratio), and/or an offset. The offset may correspond to additional time beyond the length of time for applying the respective optimization technique(s), and may also correspond to additional space for data in the queue 505a, for example as shown in FIG. 5D.

The offset may also account for other additional time for the appliance 200a to perform other processes besides the optimization technique(s) on the data in the queue 505a.

The compression engine 510a may set aside, select, or otherwise identify the reserved portion using multiple techniques. In some embodiments, if the identified quantity of the subset of data maintained in the queue 505a begins at the first processing cycle after the threshold, the reserved portion set aside by the compression engine 510a may begin at the first processing cycle subsequent to the threshold and may end at one reduction ratio for example as shown in FIG. 5B. In some embodiments, if the identified quantity of the subset of data maintained in the queue 505a begins at the first processing cycle after the beginning of the queue 505a, the reserved portion set aside by the compression engine 510a may begin at the first processing cycle subsequent to the beginning of the queue 505a and may end at one reduction ratio, for example as shown in FIG. 5C. In some embodiments, if the identified quantity of the subset of data maintained in the queue 505a begins at some multiple of the processing cycle after the beginning of the queue 505a, the reserved portion set aside by the compression engine 510a may begin at the multiple of the processing cycle subsequent to the beginning of the queue 505a and may end at one reduction ratio. In some embodiments, if the identified quantity of the subset of data maintained in the queue 505a begins at the threshold, the reserved portion identified by the compression engine 510a may begin at the threshold and may end at one reduction ratio. By reserving the portion of the queue 505a to place the data to undergo the optimization technique(s), the compression engine 510a may preserve the subset of data in the queue 505a not undergoing the optimization technique(s) while allowing the other subset in the queue 505a to undergo the optimization technique(s). Furthermore, reserving in this manner may allow for the prevention of jitter to the connection as the compression engine 510a may have ample time to perform optimization technique(s) as well as other processing on the data prior to moving at least some of the data in the queue 505a to other connected devices. Illustrations of these multiple techniques used to set aside the reserved portion are detailed below in conjunction with FIGS. 5B-5D.

Referring now to FIG. 5B, depicted is a block diagram of an embodiment of a queue 505a in performing compression of data. The queue 505a may have stored received data 530 below a pre-specified capacity 525. The received data 530 may have been received via the one or more links for communicating or processing data from the one or more clients 102a-n, the one or more servers 106a-n, and/or other appliances 200b-n. The compression engine 510a may determine that a length of time for moving the received data 530 is greater than a threshold 535. In the example depicted, the received data 530 may exceed a compression cycle 540 and the threshold 535. In response, the compression engine 510a may proceed to perform compression on at least a subset of the received data 530 maintained in the queue 505a.

As depicted in FIG. 5A, in some embodiments, the compression engine 510a may identify the subset of received data 530 to undergo compression, as ranging from the second compression cycle 540b to the end of the received data 530. The compression engine 510a may then reserve a portion 555 of the queue 505a based on a compression ratio 565 for the compression of data to be applied. Once the portion 555 is reserved, the compression engine 510a may remove the identified subset of data from the queue 505a, thereby leaving behind non-compressed data 550 still in the queue 505a. The compression engine 510a may then apply compression to the identified subset to generate compressed data 545. As the compression is applied, the appliance 200a may receive more data from the one or more links, and the queue 505a may place additional, incoming data 560 beyond the reserved portion 555. Concurrently, the compression engine 510a may also proceed to move at least some of the non-compressed data 550 out of the queue 505a to the one or more clients 102a-n, the one or more servers 106a-n, and/or other appliances 200b-n via the one or more links.

By compressing the subset of data for placement in the reserved portion 555 in this manner and moving existing data 550 and placing additional incoming data 560 in this manner, the compression engine 510a may reduce delay and may eliminate jitter. In the example shown in FIG. 5B, the length of the received data 530 may be 20 milliseconds, the threshold 535 may be 2 milliseconds, and the compression cycle 540 may be 0.5 milliseconds. In this example scenario, the compression engine 510a may identify 17.5 milliseconds (20-2-0.5 milliseconds) of corresponding data beyond the second compression cycle 540b in the queue 505a as to undergo compression. Using this figure, the compression engine 510a may estimate the compression ratio 565 as 5:1 for instance. Based on the estimated compression ratio, the compression engine 510a may set the reserved portion 555 to 3.5 milliseconds (20% of 17.5 milliseconds). As the compression engine 510a performs compression on the 17.5 milliseconds of identified data in the queue 505a, incoming data 560 may be received at the appliance 200a. The compression engine 510a may place the incoming data 560 beyond the reserved portion 555. As there is 3.5 milliseconds instead of 17.5 milliseconds of data returned to the queue 505a, there may be 14 milliseconds of less delay with no additional jitter introduced. Additional new data packets arriving at the appliance 200a may also benefit from the reduction in delay.

Referring now to FIG. 5C, depicted is a block diagram of an embodiment of a queue 505a involved in performing compression of data. Similar to the scenario depicted in FIG. 5B, the queue 505a of FIG. 5C may have stored received data 530 exceeding the threshold 535. In some embodiments, such as the ones depicted in FIG. 5C, the compression engine 510a may identify (e.g., responsive to the threshold 535 being exceeded or met) a subset of received data 530 to undergo compression as ranging from the compression cycle 540 measured from the start of the queue 505a to the end of the received data 530. The compression engine 510a may reserve a portion 555' of the queue 505a based on a compression ratio 565' for the compression of the data to be applied. The compression engine 510a may then apply compression to the identified subset to generate compressed data 545' and preserve a remaining, non-compressed data 550'. As the subset of received data 530 may be greater than that in the scenario illustrated in FIG. 5B, the compressed data 545', non-compressed data 550', reserved portion 555', and the compression ratio 565' may differ from the compressed data 545, non-compressed data 550, reserved portion 555, and the compression ratio 565. Similarly, while the compression is applied, the appliance 200a may receive more data from the one or more links, and the queue 505a may place, locate or accept additional, incoming data 560 (at a pointer value) beyond the reserved portion 555'. Concurrently, the compression engine 510a may also proceed to move the non-compressed data 550' out of the queue 505a to the one or more clients 102a-n, the one or more servers 106a-n, and/or other appliances 200b-n via the one or more links.

Referring now to FIG. 5D, depicted is a block diagram of an embodiment of a queue 505a in performing compression of data. Similar to the scenario depicted in FIG. 5B, the compression engine 510a may identify the subset of received data 530 to undergo compression as ranging from the second compression cycle 540b to the end of the received data 530. In contradistinction to FIG. 5B, however, the portion 555" reserved by the compression engine 510a may include the compression ratio 565 plus an offset 570. The offset 570 may be used or allocated for processing on the identified subset of data by the appliance 200a in addition to the compression ratio 565. Once the portion 555" is reserved, the compression engine 510a may remove the identified subset of data from the queue 505a, thereby leaving behind non-compressed data 550 in the queue 505a. The compression engine 510a may then apply compression to the identified subset to generate compress data 545. As the compression is applied, the appliance 200a may receive more data from the one or more links, and the queue 505a may place additional, incoming data 560 beyond the reserved portion 555" including the compression ratio 565 and the offset 570. Concurrently, the compression engine 510a may also proceed to move the non-compressed data 550 out of the queue 505a to the one or more clients 102a-n, the one or more servers 106a-n, and/or other appliances 200b-n via the one or more links. In some embodiments, the offset 570 may be used in conjunction with the compression ratio 565' for reserving the portion 555' for processing the identified subset of received data 530 depicted in FIG. 5C.

Referring back to FIG. 5A, having reserved the portion set aside for placing the data obtained from applying the respective optimization technique(s), the compression engine 510a may remove the identified subset of data corresponding to the quantity of data that is to undergo the optimization technique(s) from the queue 505a. With the identified subset of data removed from the queue 505a, the compression engine 510a may apply the respective optimization techniques on the identified subset of data from the queue 505a. In some embodiments, the compression engine 510a may apply a compression technique on the identified subset of data from the queue 505a. The compression technique may include entropy-type compression algorithms (e.g., Huffman coding, Shannon coding, Golomb coding, Universal coding), dictionary-type compression algorithms (e.g., prediction by partial matching, Lempel-Ziv compression, Snappy), and other types of compression algorithms (e.g., run-length encoding), among others. In some embodiments, the compression engine 510a may apply an encryption technique on the identified subset of data from the queue 505a. The encryption technique may include public key cryptography (e.g., using RSA, Diffie-Hellman key exchange, elliptic curve cryptography), cryptographic hash functions (e.g., Secure Hash Algorithm, message authentication codes), block ciphers (e.g., Advanced Encryption Standard, Blowfish, Twofish, Data Encryption Standard), and stream cipher (e.g., RC4, A5/1), among others. In some embodiments, the compression engine 510a may apply a data de-duplication technique on the identified subset of data from the queue 505a. The data de-duplication technique may be sometimes considered one of the compression techniques, and may include one of LZ77, LZ78, and MD5, among others.

Concurrent to the application of the optimization technique(s) on the identified subset of data in the queue 505a, the appliance 200a may move or send a remaining quantity of the data from the queue 505a to the one or more clients 102a-n, the one or more servers 106a-n, and/or the other appliances 200b-n. The remaining quantity may be moved or otherwise transmitted via one or more data sinks, such as the one or more links through the networks 104, 104', and/or 104". The remaining quantity may correspond to a subset of data stored in the queue 505a that is not to undergo optimization technique(s). The remaining quantity of data to be moved out may correspond to at least one processing cycle of the optimization technique(s). In some embodiments, the remaining quantity of data may correspond to at least one processing cycle plus the offset for additional processing by the appliance 200a. The appliance 200a may move the remaining quantity of data prior to or after the completion of the optimization technique(s) on the quantity of data identified as to undergo the optimization technique(s), or during application of the optimization technique(s). In some embodiments, the remaining quantity of data may be moved out within one processing cycle of the optimization technique(s). In this manner, the appliance 200a may reduce and/or eliminate jitter and packet delay variation in the one or more links, as less or no delay is seen from the perspective of the receiving-end devices such as the one or more clients 102a-n, the one or more servers 106a-n, and/or the other appliances 200b-n.

Furthermore, while applying the optimization technique(s) on the quantity of existing data identified as to undergo such technique(s), the compression engine 510a may place additional, incoming data into the queue 505a beyond the reserved portion. The placement of the incoming data into the queue 505a beyond the reserved portion may occur prior to, after and/or concurrent to the application of the optimization technique(s). In some embodiments, to manage the addition of incoming data into the queue 505a, the compression engine 510a may set a pointer to at or beyond the end of the reserved portion in the queue 505a. As additional data is received at the appliance 200a, the compression engine 510a may place the incoming data beyond the pointer in the queue 505a. Once placed, in some embodiments, the compression engine 510a may increment, update, or otherwise set the pointer to the next point or location in the queue 505a to place more, additional data. By placing the new, incoming data at an earlier point in the queue 505a in this manner, the compression engine 510a may reduce and/or eliminate delay (or the introduction of delay) in communications between the appliance 200a with the one or more clients 102a-n, the one or more servers 106a-n, and/or other appliances 200b-n. In addition, jitter and packet delay variation from the perspective of other connected devices may be reduced, avoided, and/or eliminated, as existing data is moved out of the queue 505a simultaneously with new, incoming data moving into the queue 505a all the while the optimization technique(s) are applied to an identified subset of data.

Some of the incoming data received from other appliances 200b-n may have been processed using optimization technique(s). In some embodiments, some of the existing data in the queue 505a may also have been processed using such technique(s). To recover the original data from the processed data, the decompression engine 515a may apply optimization technique(s) in inverse. In some embodiments, the decompression engine 515a may identify a subset of the data as having been processed using optimization technique(s). For example, the decompression engine 515a may read a first few bytes of the data to determine whether the data has been processed using such techniques (e.g., compression, encryption, and de-duplication) and identify which type of optimization technique(s) was applied (e.g., types of compression algorithms, encryption algorithms, and data de-duplication algorithms).

In some embodiments, the decompression engine 515a may apply the respective optimization techniques in inverse on the identified subset of data from the queue 505a. In some embodiments, the decompression engine 515a may apply a decompression technique on the subset of data from the queue 505a. The decompression technique may include entropy-type decompression algorithms (e.g., Huffman coding, Shannon coding, Golomb coding, Universal coding), dictionary-type decompression algorithms (e.g., prediction by partial matching, Lempel-Ziv compression, Snappy), and other types of decompression algorithms (e.g., run-length encoding), among others. In some embodiments, the decompression engine 515a may apply a decryption technique on the identified subset of data from the queue 505a. The decryption technique may include public key cryptography (e.g., using RSA, Diffie-Hellman key exchange, elliptic curve cryptography), cryptographic hash functions (e.g., Secure Hash Algorithm, message authentication codes, etc.), block ciphers (e.g., Advanced Encryption Standard, Blowfish, Twofish, Data Encryption Standard), and stream cipher (e.g., RC4, A5/1), among others. In some embodiments, the decompression engine 515a may apply a data redundancy technique on the identified subset of data from the queue 505a. The data de-data redundancy technique may be sometimes considered one of the decompression techniques, and may include one of LZ77, LZ78, and MD5, among others.

Figure 5E:
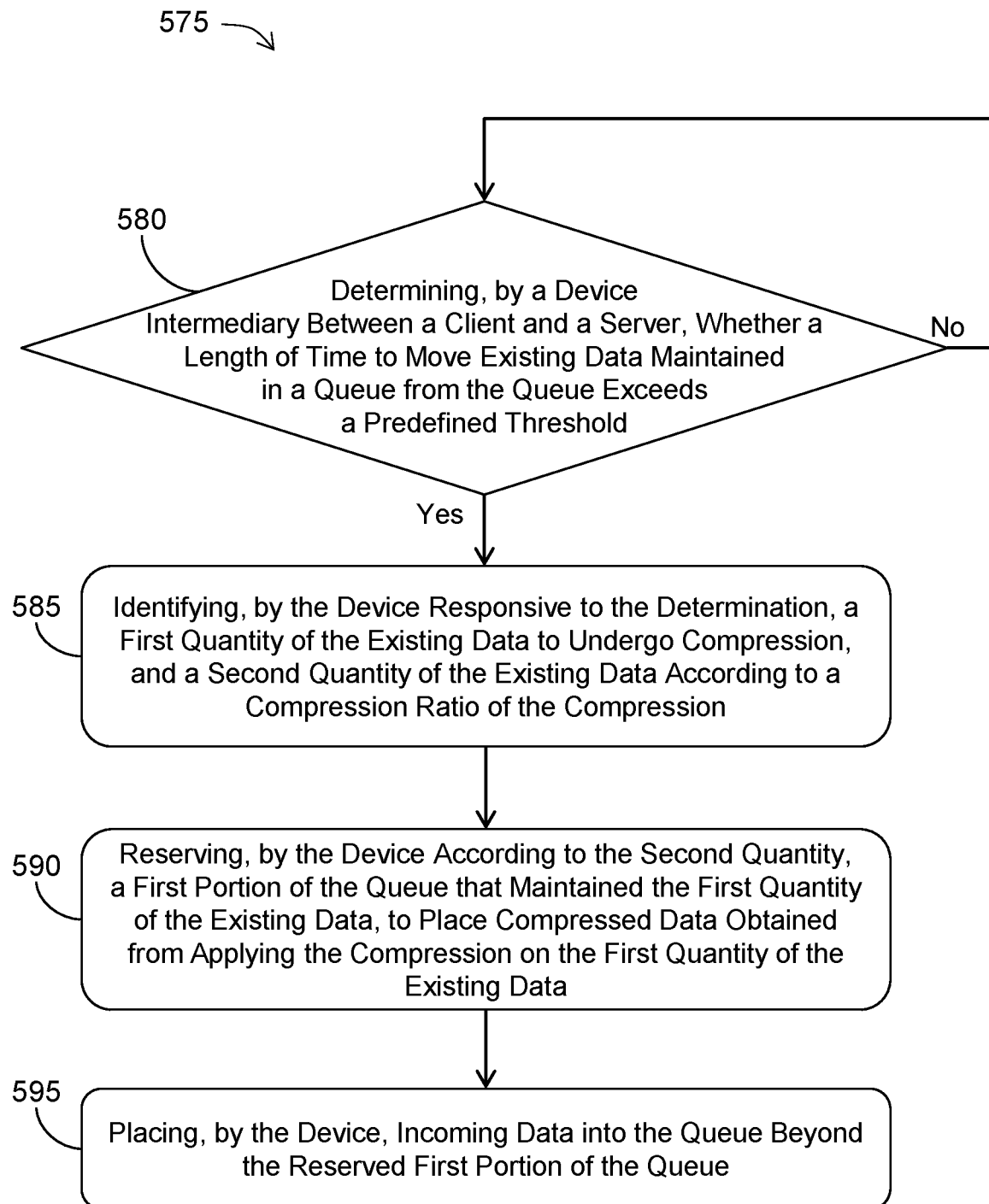
FIG. 5E is a flow diagram of method of performing compression of data in a queue, in accordance with an illustrative embodiment.

Referring now to FIG. 5E, illustrated is a flow diagram of an embodiment of a method 575 for performing compression of data in a queue. The operations and functionalities of method 565 may be implemented using the system 505 described above. In brief overview, a device intermediary between a client and a server may determine whether a length of time to move existing data maintained in a queue from the queue exceeds a predefined threshold (575). If the length of time to move exceeds the predefined threshold, the device may identify a first quantity of the existing data to undergo compression, and a second quantity of the existing data according to a compression ratio of the compression (580). The device may reserve, according to the second quantity, a first portion of the queue that maintained the first quantity of the existing data, to place compressed data obtained from applying the compression on the first quantity of the existing data (585). The device may place incoming data into the queue beyond the reserved first portion of the queue (590).

In further detail, referring to (580), and in some embodiments, a device intermediary between a client and a server may determine whether a length of time to move existing data maintained in a queue from the queue exceeds a predefined threshold. The queue may maintain or store data from the client, the server, and/or another intermediary device deployed between the client and the server. The data maintained may be moved from the queue via one or more links between the client, the server, and/or another intermediary device. The threshold used for the determination may be fixed to a percentage or fraction of a queue capacity of the queue or may be dynamic based on any number of factors, such as number of data sources for the queue, computing resources on the device, and/or network resources, among others. The device may sample the existing data in the queue to identify a size of the data therein. The device may also determine a rate of incoming data from each source. To determine the length of time, the device may calculate a quotient of the size of the existing data in the queue and a sum of the rates of incoming data from various sources. Once determined, the device may compare the length of time for moving existing data with the threshold. If the length of time to move does not exceed the predefined threshold, the device may wait to receive more data and may repeat the functionality of (580).

Referring to (585), and in some embodiments, if the length of time to move exceeds the predefined threshold, the device may identify a first quantity of the existing data to undergo compression, and a second quantity of the existing data according to a compression ratio of the compression. The first quantity identified by the device may correspond to a length of time corresponding to a subset of data maintained in the queue to be compressed. In some embodiments, the first quantity may correspond to the subset of data ranging from the predefined threshold to the end of the existing data in the queue. In some embodiments, the first quantity may correspond to the subset of data ranging from the predefined threshold plus one compression cycle to the end of the existing data in the queue. In some embodiments, the first quantity may correspond to the subset of data ranging from at least one compression cycle after the beginning of the queue to the end of the existing data in the queue. The second quantity identified by the device may correspond to a length of time corresponding to the subset of data after having undergone compression and may be based on the compression ratio. The compression ratio may depend on the first quantity of data to be compressed. The device may estimate the second quantity based on a function with the first quantity as an input.

Referring to (590), and in some embodiments, the device may reserve, according to the second quantity, a first portion of the queue that maintained the first quantity of the existing data, to place compressed data obtained from applying the compression on the first quantity of the existing data. The device may reserve the first portion of the queue for maintaining a subset of data not to undergo compression and for placing the compressed data. The reserved portion of the queue may be based on the second quantity of data, the threshold, the compression ratio, and an offset. In some embodiments, the reserved portion may range from the predefined threshold plus one compression cycle to one compression ratio. In some embodiments, the reserved portion may range from at least one compression cycle subsequent to the beginning of the queue to the compression ratio. In some embodiments, the reserved portion may range from the predefined threshold to the compression ratio. In some embodiments, the offset may be added into the reserved portion for placing the compressed data. Having set aside the reserved portion, the device may perform compression on the first quantity corresponding to the subset of data identified as to undergo compression.

Referring to (595), and in some embodiments, the device may place incoming data into the queue beyond the reserved first portion of the queue. While performing compression, the device may set a pointer to or beyond the end of the reserved portion to keep track of placement of incoming data. As more and more data is received, the device may update or increment the pointer. Concurrent to placement of the incoming data, the device may also move the existing, non-compressed data prior to the reserved portion to the client, the server, and/or the other intermediary devices. In this manner, jitter and packet delay variation may be reduced and/or eliminated from the perspective of other devices in communication with the intermediary device, as existing data is moved out of the queue while new data is received while the compression is applied to the identified subset of data.

Various elements, which are described herein in the context of one or more embodiments, may be provided separately or in any suitable subcombination. For example, the processes described herein may be implemented in hardware, or a combination of hardware and software. Further, the processes described herein are not limited to the specific embodiments described. For example, the processes described herein are not limited to the specific processing order described herein and, rather, process blocks may be re-ordered, combined, removed, or performed in parallel or in serial, or in response to another process block, as necessary, to achieve the results set forth herein.

It will be further understood that various changes in the details, materials, and arrangements of the parts that have been described and illustrated herein may be made by those skilled in the art without departing from the scope of the following claims.

We claim:

1. A method for performing compression of data in a queue, the method comprising:
   determining, by a device intermediary between a client and a server, that a length of time to move existing uncompressed data maintained in a queue from the queue exceeds a predefined threshold;
   identifying, by the device responsive to the determination, a first quantity of the existing uncompressed data to undergo compression, and a second quantity of the existing uncompressed data according to a compression ratio of the compression;
   reserving, by the device according to the second quantity, a first portion of the queue that maintained a portion of the first quantity of the existing uncompressed data that is beyond another portion of the queue that maintained the second quantity of the existing uncompressed data, to place compressed data obtained from applying the compression on the first quantity of the existing uncompressed data; and
   placing, by the device, the compressed data into the reserved first portion of the queue, and uncompressed incoming data into the queue beyond the reserved first portion of the queue.

2. The method of claim 1, wherein the existing uncompressed data maintained in the queue comprises uncompressed data to be moved from the queue to one or more links for transfer or processing between the client and the server.

3. The method of claim 1, further comprising applying, by the device, the compression on the first quantity of the existing uncompressed data, wherein the compression does not introduce jitter to the connection.

4. The method of claim 1, further comprising determining, by the device, not to apply compression on the uncompressed incoming data, responsive to determining that a length of time for moving the uncompressed incoming data from the queue does not exceed the predefined threshold.

5. The method of claim 1, further comprising determining a portion of the expected length of time that exceeds the predefined threshold, and subtracting a length of time for applying the compression from the determined portion to obtain a remaining length of time.

6. The method of claim 5, further comprising identifying the first quantity of the existing uncompressed data to undergo compression, according to the remaining length of time.

7. The method of claim 1, wherein placing the uncompressed incoming data into the queue beyond the reserved first portion of the queue provides a reduction in delay for communicating the uncompressed incoming data between the client and the server.

8. The method of claim 1, further comprising moving, by the device, a third quantity of the existing uncompressed data from the queue to one or more links, wherein the one or more links comprise a first link that at least one of: communicates or processes at least a portion of the third quantity of the data between the client and the server.

9. The method of claim 1, further comprising moving, by the device, a third quantity of the existing uncompressed data from the queue to one or more links, while applying the compression on the first quantity of the existing uncompressed data.

10. The method of claim 1, further comprising placing the uncompressed incoming data into the queue beyond the reserved first portion of the queue, before the compression on the first quantity of the existing uncompressed data is completed.

11. A system for performing compression of data in a queue, the system comprising:
    a queue of a device intermediary between a client and a server, the device having one or more processors, the queue configured to maintain existing uncompressed data received from the client or the server; and
    a compression engine executable on the one or more processors of the device, the compression engine configured to:
       determine that a length of time for moving the existing uncompressed data maintained in the queue from the queue exceeds a predefined threshold;
       identify, responsive to the determination, a first quantity of the existing uncompressed data to undergo compression, and a second quantity of the existing uncompressed data according to a compression ratio of the compression;
       reserve, according to the second quantity, a first portion of the queue that maintained a portion of the first quantity of the existing uncompressed data that is beyond another portion of the queue that maintained the second quantity of the existing uncompressed data, to place compressed data obtained from applying the compression on the first quantity of the existing uncompressed data; and
       place the compressed data into the reserved first portion of the queue, and uncompressed incoming data into the queue beyond the reserved first portion of the queue.

12. The system of claim 11, wherein the existing uncompressed data maintained in the queue comprises uncompressed data to be moved from the queue to one or more links for transfer or processing between the client and the server.

13. The system of claim 11, wherein the compression engine is further configured to apply the compression on the first quantity of the existing uncompressed data, wherein the compression does not introduce jitter to the connection.

14. The system of claim 11, wherein the compression engine is further configured to determine not to apply compression on the uncompressed incoming data, responsive to determining that a length of time for moving the uncompressed incoming data from the queue does not exceed the predefined threshold.

15. The system of claim 11, wherein the compression engine is further configured to determine a portion of the expected length of time that exceeds the predefined threshold, and subtract a length of time for applying the compression from the determined portion to obtain a remaining length of time.

16. The system of claim 15, wherein the compression engine is further configured to identify the first quantity of the existing uncompressed data to undergo compression, according to the remaining length of time.

17. The system of claim 11, wherein the compression engine is further configured to provide a reduction in delay for communicating the uncompressed incoming data between the client and the server, in placing the uncompressed incoming data into the queue beyond the reserved first portion of the queue.

18. The system of claim 11, wherein the compression engine is further configured to move a third quantity of the existing uncompressed data from the queue to one or more links, wherein the one or more links comprise a first link that is configured to at least one of: communicate or process at least a portion of the third quantity of the data between the client and the server.

19. The system of claim 11, wherein the compression engine is further configured to move a third quantity of the existing uncompressed data from the queue to one or more links, while the compression is applied on the first quantity of the existing uncompressed data.

20. The system of claim 11, wherein the compression engine is further configured to place the uncompressed incoming data into the queue beyond the reserved first portion of the queue, before the compression on the first quantity of the existing uncompressed data is completed.

* * * * *